(12) United States Patent
Okubo et al.

(10) Patent No.: US 8,606,069 B2
(45) Date of Patent: Dec. 10, 2013

(54) PLAYBACK DEVICE, PLAYBACK METHOD, AND COMPUTER-READABLE RECORDING MEDIUM FOR ENSURING STABLE APPLICATION EXECUTION IN SYNCHRONISM WITH VIDEO DATA PLAYBACK

(75) Inventors: Masafumi Okubo, Osaka (JP); Masahiro Oashi, Kyoto (JP); Hidetaka Ohto, Hyogo (JP)

(73) Assignee: Panasonic Corporation, Osaka (JP)

( * ) Notice: Subject to any disclaimer, the term of this patent is extended or adjusted under 35 U.S.C. 154(b) by 1631 days.

(21) Appl. No.: 11/574,777

(22) PCT Filed: Sep. 7, 2005

(86) PCT No.: PCT/JP2005/016419
§ 371 (c)(1),
(2), (4) Date: Mar. 6, 2007

(87) PCT Pub. No.: WO2006/028132
PCT Pub. Date: Mar. 16, 2006

(65) Prior Publication Data
US 2008/0075419 A1    Mar. 27, 2008

(30) Foreign Application Priority Data
Sep. 8, 2004 (JP) .................................. 2004-261377

(51) Int. Cl.
*H04N 5/765* (2006.01)
(52) U.S. Cl.
USPC .......................................... 386/200; 715/814
(58) Field of Classification Search
USPC .................... 386/239, 240, 248, 200; 715/814
See application file for complete search history.

(56) References Cited

U.S. PATENT DOCUMENTS

| 4,620,229 | A | | 10/1986 | Amano et al. |
| 5,363,481 | A | * | 11/1994 | Tilt ................................ 715/814 |
| 5,900,905 | A | * | 5/1999 | Shoff et al. ..................... 725/91 |

(Continued)

FOREIGN PATENT DOCUMENTS

| EP | 0852443 | | 7/1998 |
| JP | 58-172016 | * | 10/1983 |

(Continued)

OTHER PUBLICATIONS

Research Disclosure, "Improved Usability on a Standard Pointing Device Though Filter and Bouncy Key Enablement", UK, vol # 41, Issue#415, Nov. 1, 1998.*

(Continued)

*Primary Examiner* — David Harvey
(74) *Attorney, Agent, or Firm* — Greenblum & Bernstein, P.L.C.

(57) ABSTRACT

A playback device executes playback of video data in sync with an application program associated with the video data. The playback device includes an activating unit for activating the application program, a receiving unit for receiving from a user an input specifying a playback section associated with a piece of video data and an application program, and an activation control unit. If a first input is received from the user by the receiving unit and a second input is received within the predetermined time period from reception of the first input, the activation control unit discards the first input. If a third input is not received within the predetermined time period from reception of the second input, the activation control unit activates an application program according to the second input.

5 Claims, 46 Drawing Sheets

(56) References Cited

U.S. PATENT DOCUMENTS

| | | | |
|---|---|---|---|
| 6,201,540 B1* | 3/2001 | Gallup et al. | 715/764 |
| 6,430,542 B1* | 8/2002 | Moran | 705/36 R |
| 6,489,978 B1* | 12/2002 | Gong et al. | 715/845 |
| 6,970,641 B1* | 11/2005 | Pierre et al. | 386/239 |
| 7,596,298 B2* | 9/2009 | Kelly et al. | 386/343 |
| 7,617,518 B2* | 11/2009 | Jung et al. | 725/153 |
| 7,630,614 B2 | 12/2009 | Kelly | |
| 2002/0009290 A1* | 1/2002 | Piesing et al. | 386/85 |
| 2002/0051081 A1 | 5/2002 | Hori et al. | |
| 2002/0080179 A1* | 6/2002 | Okabe et al. | 345/769 |
| 2003/0002853 A1 | 1/2003 | Hori et al. | |
| 2003/0070165 A1 | 4/2003 | Houldsworth | |
| 2003/0086692 A1 | 5/2003 | Hori et al. | |
| 2003/0161615 A1 | 8/2003 | Tsumagari et al. | |
| 2004/0098730 A1 | 5/2004 | Foote et al. | |
| 2004/0109672 A1 | 6/2004 | Kim et al. | |
| 2004/0156620 A1 | 8/2004 | Horie et al. | |
| 2004/0234107 A1* | 11/2004 | Machida et al. | 382/107 |
| 2005/0019004 A1 | 1/2005 | Kelly | |
| 2007/0006276 A1* | 1/2007 | Ashley et al. | 725/134 |
| 2007/0086727 A1 | 4/2007 | Tanaka et al. | |
| 2008/0075419 A1* | 3/2008 | Okubo et al. | 386/66 |

FOREIGN PATENT DOCUMENTS

| | | |
|---|---|---|
| JP | 60-231229 | 11/1985 |
| JP | 62-185290 | 8/1987 |
| JP | 5-207409 | 8/1993 |
| JP | 2001-195808 | 7/2001 |
| JP | 2002-125199 | 4/2002 |
| JP | 2003-513555 | 4/2003 |
| JP | 2003-203424 | 7/2003 |
| JP | 2004-007128 | 1/2004 |
| JP | 2004-242291 | 8/2004 |
| KR | 1993-0010619 | 10/1993 |
| KR | 2002-0060932 | 7/2002 |
| WO | 01/33847 | 5/2001 |
| WO | WO 01/33847 * | 5/2001 |
| WO | 03/025746 | 3/2003 |
| WO | 03/051058 | 6/2003 |

OTHER PUBLICATIONS

Tanebaum, "Structured Computer Organization", pp. 10-12, 1984.*
U.S. Appl. No. 10/596,107 to Hashimoto et al., which was filed on May 31, 2006.
U.S. Appl. No. 10/597,614 to Tanaka et al., which was filed on Aug. 1, 2006.
U.S. Appl. No. 11/568,555 to Hashimoto et al., which was filed on Nov. 1, 2006.
U.S. Appl. No. 11/568,862 to Tanaka et al., which was filed on Nov. 9, 2006.
U.S. Appl. No. 11/572,243 to Oashi et al., which was filed on Jan. 17, 2007.
English Language Abstract of JP 2004-7128.
English Language Abstract of JP 60-231229.
English Language Abstract of JP 5-207409.
English Language Abstract of JP 2001-195808.
English Language Abstract of JP 62-185290.
English Language Abstract of JP 2003-203424.
English Language Abstract of JP 2002-125199.
E.P.O. Office action, mail date is Mar. 11, 2011.
"TS 102 812 V1.2.1: Digital Video Broadcasting (DVB) Multimedia Home Platform (MHP) Specification 1.1.1," ETSI, No. V1.2.1, pp. 1-1086, XP002326584, (Jun. 2003).
Peng et al., "Digital Television Application Manager," ICME 2001, IEEE, pp. 1207-1210 (paginated as 685-688 on the publication submitted), XP010662062, ISBN 0/7695-1198, (Aug. 2001).

* cited by examiner

FIG.5

Application Management Information

| Application ID | Activation Attribute | BIND Attribute |
|---|---|---|
| application #1 | Auto Start | bound |
| application #2 | Present | unbound |
| ⋮ | ⋮ | ⋮ |

Application Activation State Management Information

| Application ID | Application Activation State |
|---|---|
| application #1 | Auto Start |
| application #2 | Auto Start |
| application #3 | Present |
| application #4 | Present |

PlayList Management Information

| Auto Playback Flag | PlayList Name |
|---|---|
| ON | PlayList #1 |
| | PlayList #2 |
| | PlayList #3 |

1301 → Auto Playback Flag; PlayList Name ← 1302

FIG.19

Title Attribute Information

| | | |
|---|---|---|
| 1901 | Title Object Type | BD-J |
| 1902 | Title Access Type | Accessible |
| 1903 | Title Playback Type | Movie |
| 1904 | Title Object Name | BD-J Obj #1 |

FIG.20

TitleList title #1

| Title Object Type | BD-J |
| --- | --- |
| Title Access Type | Accessible |
| Title Playback Type | Movie |
| Title Object Name | BD-J Obj #1 | title #2

| Title Object Type | HDMV |
| --- | --- |
| Title Access Type | Not Accessible |
| Title Playback Type | Interactive |
| Title Object Name | Movei Obj #2 |

FIG.23

Player Variables (System Parameters)

| # | Parameter | # | Parameter | # | Parameter |
|---|---|---|---|---|---|
| 0 | Interactive Graphics | 11 | Menu Page id | 22 | reserved |
| 1 | Audio stream number | 12 | User Style id | 23 | reserved |
| 2 | Presentation Graphics (P-GFX) and Text subtitle stream number | 13 | Parental level | 24 | reserved |
| 3 | Angle number | 14 | reserved | 25 | reserved |
| 4 | Title number | 15 | Player configuration for Audio | 26 | reserved |
| 5 | Chapter number | 16 | Language code for Audio | 27 | reserved |
| 6 | PlayList id | 17 | Language code for P-GFX and Text subtitle | 28 | reserved |
| 7 | PlayItem id | 18 | Language code for Menu | 29 | reserved |
| 8 | Presentation Time | 19 | reserved | 30 | Player Capability for Text subtitle |
| 9 | Navigation timer | 20 | reserved | 31 | Player Version |
| 10 | Button id in Selected State | 21 | reserved | 32 | reserved |

FIG.24
Trickplay Information

Fast Forward Playback

| Trickplay Operations in DVD-Like Mode | | Supported Playback Rate |
|---|---|---|
| Button ID | Number of Buttons Pushed | |
| Fast-Forward #1 | 1 | 2.0 |
| — | — | 10.0 |
| Fast-Forward #1 | 2 | 30.0 |
| — | — | 60.0 |
| Fast-Forward #1 | 3 | 120.0 |

Fast Reverse Playback

| Trickplay Operations in DVD-Like Mode | | Supported Playback Rate |
|---|---|---|
| Button ID | Number of Buttons Pushed | |
| Fast Reverse #1 | 1 | -2.0 |
| — | — | -10.0 |
| Fast Reverse #1 | 2 | -30.0 |
| — | — | -60.0 |
| Fast Reverse #1 | 3 | -120.0 |

Slow Forward Playback

| Trickplay Operations in DVD-Like Mode | | Supported Playback Rate |
|---|---|---|
| Button ID | Number of Buttons Pushed | |
| Slow #1 | 1 | 0.5 |
| — | — | 0.1 |
| Slow #1 | 2 | 0.01 |

Slow Reverse Playback

| Trickplay Operations in DVD-Like Mode | | Supported Playback Rate |
|---|---|---|
| Button ID | Number of Buttons Pushed | |
| Slow #2 | 1 | -0.5 |
| — | — | -0.1 |
| Slow #2 | 2 | -0.01 |

FIG.28

Application Management Information

| Effective Period | Application ID | Activation Attribute |
|---|---|---|
| title #1 | application #1 | AutoStart |
| title #1 chapter#1 | application #2 | Present |
| title #1 chapter#2 | application #2 | AutoStart |
| title #1 | application #3 | Present |
| title #2 PlayList#2:PlayItem#1 | application #3 | Present |
| title #2 PlayList#2:PlayItem#2 | application #3 | AutoStart |
| title #2 PlayList#2 | application #4 | AutoStart |

FIG.33

Application Management Information

| Effective Period | Application ID | Activation Attribute | In-Trickplay End Flag |
|---|---|---|---|
| title #1 | application #1 | AutoStart | Yes |
| title #1 chapter#1 | application #2 | Present | No |
| title #1 chapter#2 | application #2 | AutoStart | No |
| title #1 | application #3 | Present | No |
| title #2 PlayList#2 PlayItem#1 | application #3 | Present | No |
| title #2 PlayList#2 PlayItem#2 | application #3 | AutoStart | No |
| title #2 PlayList#2 | application #4 | AutoStart | Yes |

FIG.35

Application Management Information

| Effective Period | Application ID | Activation Attribute | In-Trickplay Activation Flag |
|---|---|---|---|
| title #1 | application #1 | AutoStart | Yes |
| title #1 chapter#1 | application #2 | Present | No |
| title #1 chapter#2 | application #2 | AutoStart | No |
| title #1 | application #3 | Present | No |
| title #2 PlayList#2 PlayItem#1 | application #3 | Present | No |
| title #2 PlayList#2 PlayItem#2 | application #3 | AutoStart | No |
| title #2 PlayList#2 | application #4 | AutoStart | Yes |

FIG.37

Application Management Information

| Effective Period | Application ID | Activation Attribute | Fast Playback Flag |
|---|---|---|---|
| title #1 | application #1 | AutoStart | Yes |
| title #1 chapter#1 | application #2 | Present | Yes |
| title #1 chapter#2 | application #2 | AutoStart | Yes |
| title #1 | application #3 | Present | Yes |
| title #2 PlayList#2 PlayItem#1 | application #3 | Present | Yes |
| title #2 PlayList#2 PlayItem#2 | application #3 | AutoStart | Yes |
| title #2 PlayList#2 | application #4 | AutoStart | Yes |

FIG.39

Application Management Information

| Effective Period | Application ID | Activation Attribute | Trickplay Rate |
|---|---|---|---|
| title #1 | application #1 | AutoStart | - |
| title #1 chapter#1 | application #2 | Present | -1.3 ~ +1.3 |
| title #1 chapter#2 | application #2 | AutoStart | -1.3 ~ +1.3 |
| title #1 | application #3 | Present | - |
| title #2 PlayList#2 PlayItem#1 | application #3 | Present | - |
| title #2 PlayList#2 PlayItem#2 | application #3 | AutoStart | - |
| title #2 PlayList#2 | application #4 | AutoStart | - |

FIG.44

Application Activation State
Management Information

| Application ID | Application Activation State |
|---|---|
| application #1 | Destroy |
| application #2 | Auto Start |
| application #3 | Present |
| application #4 | Destroy |

501

601a

PLAYBACK DEVICE, PLAYBACK METHOD, AND COMPUTER-READABLE RECORDING MEDIUM FOR ENSURING STABLE APPLICATION EXECUTION IN SYNCHRONISM WITH VIDEO DATA PLAYBACK

TECHNICAL FIELD

The present invention relates to a technique of video data playback in sync with an application and especially to an improvement on activation of the application in response to a user operation.

BACKGROUND ART

Synchronous playback of video data with an application refers to a technique used, for example, by a video playback device for executing playback of video data in sync with a Java application (Java is a registered trademark and the same holds below). The technique is expected to receive widespread attention in the field of manufacturing commercial products. Generally, an application to be executed in sync with video data is associated with one or more playback units of the video data called "titles". When a user selects an associated title, the application is activated in sync with playback of the video data.

Related prior art is disclosed, for example, in the patent documents 1 and 2 listed below.
[Patent Document 1]
  JP Patent Application Publication No. 2002-125199
[Patent Document 2]
  JP Patent Application Publication No. 2003-513555

DISCLOSURE OF THE INVENTION

Problems the Invention is Attempting to Solve

Unfortunately, however, the prior art technique involves problems caused by chattering that a user may make at the time of selecting a title. The term "chattering" refers to receiving the same user input a plurality of number of times repeatedly in an extremely short period of time. If the same user input is received quickly and repeatedly within an extremely short period of time, an application associated with the selected title is activated in iterations. As a consequence, it is likely that the screen display is disturbed or the overall system operation freezes up.

In addition, in the case where the playback device is executing trickplay, the rendering rate of an application comes to disagree with the rendering rate of video data as the playback speed increases. This causes the screen display to change too rapidly beyond a perceivable level, which makes it difficult for the users to understand what is displayed. Further, there is a case where a program associated with a section of the video data which is not very impotent to roughly understand the contents is uselessly executed.

Trickplay is a feature that allows fast-forward playback and reverse playback, title search, chapter search, time search, and the like. Depending on the type of trickplay, it is technically impossible to execute an application in sync with video data playback. Even during such trickplay, an application may be uselessly activated.

The present invention is made in view of the above problems and aims to provide a playback device ensuring that an application associated with video data is stably executed in sync with video data playback in response to a user operation even if chattering is made by the user.

Means for Solving the Problems

In order to achieve the above aim, the present invention provides a playback device for executing playback of video data in synchronization with an application program associated with the video data. The playback device includes an activating unit, a receiving unit, and an activation control unit. The activating unit is operable to activate an application program. The receiving unit is operable to receive, from a user, an input specifying one of a plurality of playback sections. Each playback section is associated with a piece of video data and an application program. If the receiving unit receives a first input followed by a second input within a predetermined time period from receipt of the first input and does not receive a third input within the predetermined time period from receipt of the second input, the activation control unit causes the activating unit to activate the application program according to the second input.

Effects of the Invention

With the above structure, the present invention invalidates the first input received from the user if the second input is received within the predetermined time period from the receipt of the first input. If the third input is not received within the predetermined time period from the receipt of the second input, the application is activated according to the second input. Consequently, it is prevented that a plurality of applications is uselessly activated, so that the screen display disturbance and freezing of the overall system operation are prevented. In addition, since the application is activated based on the second input, even if a wrong title is selected by mistake, the user is allowed to select a correct title within the predetermined time period. This prevents activation of unnecessary applications associated with the erroneously selected title.

The activation control unit may include a timer and a repeating unit. The repeating unit is operable to repeat a process of setting the timer when the receiving unit receives the first input, judging whether the second input is received within the predetermined time period from receipt of the first input, and resetting the timer when judging affirmatively. The process is repeated until a negative judgment is made.

With the above structure, upon receipt of the first input, the playback device sets the timer to judge whether the second input is received within the predetermined time period. If the second input is received within the predetermined time period, the playback device resets the timer to repeat the above process. That is to say, by repeating the above process as many times as necessary, the playback device is enabled to handle the user input made in succession more than three times.

The activation control unit may include: an acquiring unit and a judging unit. The acquiring unit is operable to acquire information indicating, for the specified playback section to which the piece of video data and the application program are associated, information indicating an activation attribute of the associated application program. The judging unit is operable to judge whether the activation attribute indicates that the application program is to be automatically executed when playback of the associated piece of video data is executed. The activation control unit is operable to execute the activation control if the judging unit judges affirmatively.

With the above structure, it is judged whether or not the activation control unit should execute the activation control in accordance with the activation attribute of the application program. The activation attribute indicates whether the application is to be automatically activated upon playback start of video data that is associated with the application. Consequently, the activation control unit executes the activation control only when the application is to be automatically activated upon playback start of video data associated with the application.

Each playback section with which a piece of video data and an application program are associated may be a title. Each title is either a Move title of which a principle aspect is in the video data or an Interactive title of which a principle aspect is in the application. The activation control unit is operable to execute the activation control if the specified playback section is a Movie title.

With the above structure, if the title is a Movie title of which a principle aspect is in the video and audio, the activation control unit executes the activation control to prevent repeated application activation a plurality of times. On the other hand, if the title is an Interactive title of which a principle aspect is an application, the application is activated in the normal manner. Thus, display is presented on the screen immediately after the title search operation. This serves to remove user's frustration.

In another aspect, the present invention provides a playback device for executing playback of video data in synchronization with an application program associated with the video data. The playback device includes an executing unit, a receiving unit, a holding unit, and an execution control unit. The executing unit is operable to execute an application program. The receiving unit is operable to receive from a user an input relating to trickplay of the video data. The holding unit is operable to hold, for each of a plurality of predetermined playback sections of the video data, management information of an application program associated with the playback section. Upon receipt of an input relating to trickplay by the receiving unit, the execution control unit is operable to control the executing unit in accordance with a state of trickplay and the management information held in the holding unit.

With the above structure, execution of the application program is controlled based on the trickplay state and the management information held in the holding unit.

The trickplay state may indicate whether trickplay is started, being executed, or terminated. The execution control unit is operable to control the executing unit, so that the executing unit is prohibited from newly activating or terminating any application program after trickplay is started or while trickplay is being executed and allowed to newly activate or terminate an application program when trickplay is terminated.

With the above structure, execution of no application program is started or terminated during trickplay. Accordingly, disagreement between the rendering rate of the application and the rendering rate of the video data no longer causes the screen display to change too rapidly beyond a perceivable level. Thus, it is avoided that the user faces difficulty in understanding the displayed contents.

The management information may include information relating to execution of each application program while trickplay is being executed. The execution control unit is operable to control the executing unit, so that the executing unit newly activates or terminates an application program even while trickplay is being executed, in accordance with the information included in the management information.

With the above structure, even during trickplay, an associated application program is executed or terminated according to the information relating to the application program. For example, there may be a case where the speed of trickplay is not too fast, so that the rendering rate of the application does not differ much from the rendering rate of video data. In such a case, the playback device executes the application program even during execution of trickplay to respond more flexibly to the user's needs.

The management information may include information indicating an activation attribute of each application. The execution control unit may include: a storage unit operable to store information indicating the activation attribute while trickplay is being executed; and a judging unit operable to judge whether the receiving unit receives from the user an input requesting trickplay start within a predetermined time period after receipt of an input requesting trickplay termination. When the judging unit judges negatively, the execution control unit may be operable to cause the executing unit to activate and terminate an application program according to the information stored in the storage unit.

With the above structure, in order to delay activation or termination of an application program, the activation attribute of the application program is stored in advance. As a result, the application is activated or terminated sooner when compared to the case where the management information is read after the trickplay ends to control execution of the application program.

BRIEF DESCRIPTION OF THE DRAWINGS

FIG. 5 illustrates an example of application management information;

FIG. 6 illustrates an example of application activation state management information;

FIG. 13 illustrates an example of PlayList management information;

FIG. 19 illustrates an example of attribute information of a title;

FIG. 20 illustrates an example of title attribute information of Title #1 and Title #2;

FIG. 23 illustrates system parameters held in AV playback library;

FIG. 24 illustrates the contents of trickplay information held in the playback device;

FIG. 28 illustrates an example of application management information according to the second embodiment;

FIG. 33 illustrates application management information which additionally includes an in-trickplay end flag according to the second embodiment;

FIG. 35 illustrates application management information which additionally includes an in-trickplay activation flag according to the second embodiment;

FIG. 37 illustrates application management information which additionally includes a fast playback flag according to the second embodiment;

FIG. 39 illustrates application management information which additionally includes a trickplay rate according to the second embodiment;

FIG. 44 illustrates an example of application activation state management information according to the third embodiment;

REFERENCE NUMERALS

301 BD Drive
302 Track Buffer
303 Demultiplexer
304 Video Decoder
305 Video Plane
306 Audio Decoder
307 Image Memory
308 Image Plane
309 Image Decoder
310 Adder
311 Static Scenario Memory
312 Dynamic Scenario Memory
313 DVD-Like Module
314 Java Module
314a Java Module
314b Java Module
315 UO Detecting Module
316 Mode Management Module
317 Dispatcher
318 Rendering Engine
319 Trickplay Management Information
320 AV Playback Library
401 Title Manager
402 Application Manager
402a Application Manager
402b Application Manager
403 Trickplay Information Acquiring Module
404 Media Playback Module
405 Playback Information Management Module
406 Application Control Module
407 Dynamic Scenario Acquiring Module
408 Static Scenario Acquiring Module
409 Playback Information Acquiring Module
410 Trickplay State Acquiring Module
411 Delayed Control Management Module
412 UO Event Distributing Module
413 Java Application
414 Java Application
501 Application ID
502 Activation Attribute
503 BIND Attribute
601 Application Activation State 1301 Auto-Playback Flag
1302 PlayList Name
1901 Title Object Type
1902 Title Access Type
1903 Title Playback Type
1904 Title Object Name
2201 Scenario Program
2202 Scenario Control Module
2203 UO Processing Module
2801 Effective Period
3301 In-Trickplay End Flag
3501 In-Trickplay Activation Flag
3701 Fast Playback Flag
3901 Trickplay Rate

BEST MODE FOR CARRYING OUT THE INVENTION

Hereinafter, embodiments of the present invention will be described with reference to the drawings.

First Embodiment

<Structure>

Figure 1:
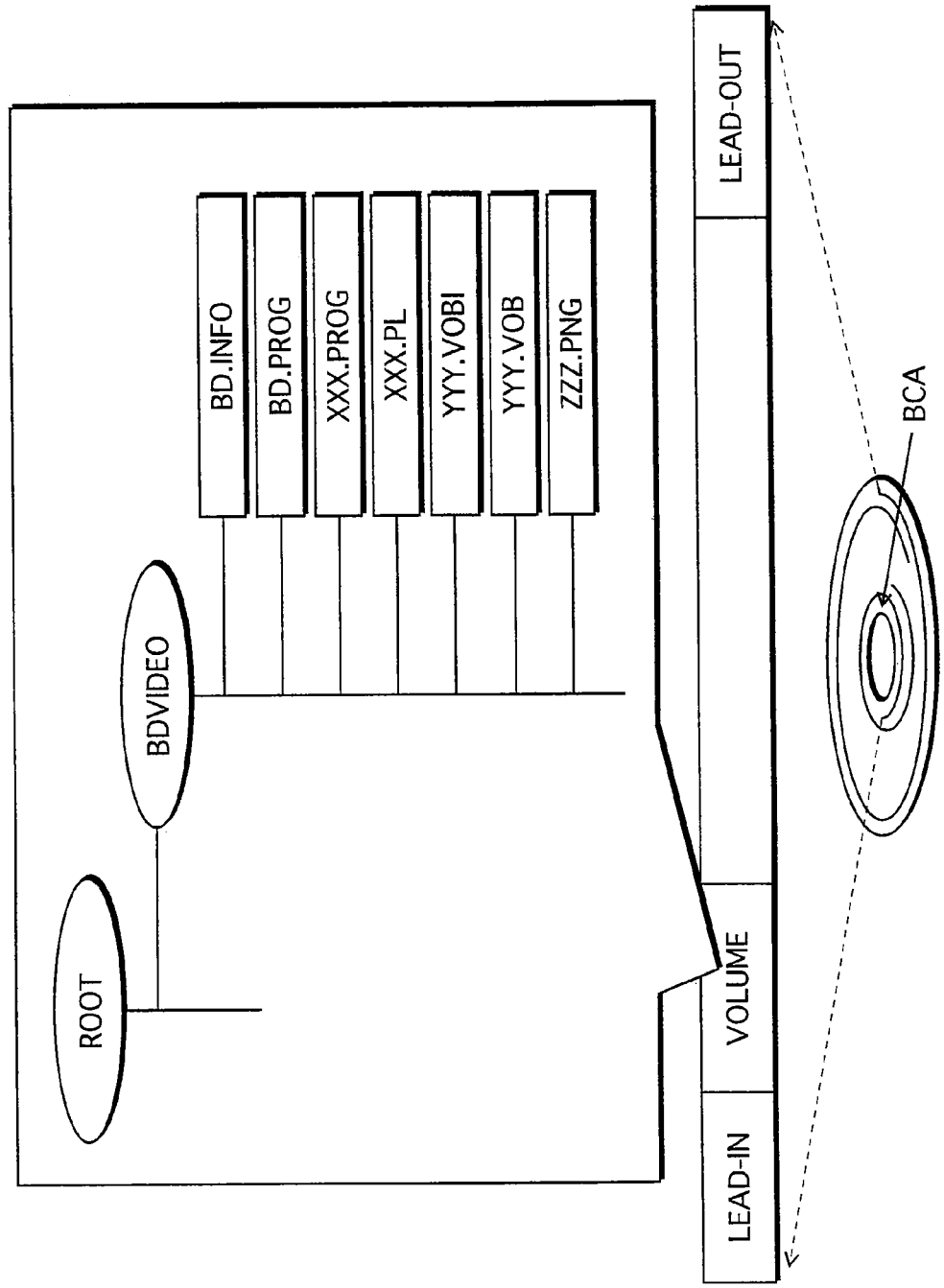
FIG. 1 illustrates a hierarchical data structure of a BD-ROM.

FIG. 1 illustrates the structure of a BD-ROM (hereinafter, may also referred to as "BD"). Similarly to other discs such as optical discs typified by DVDs and CDs, the BD disc has a recording area in spiral form that extends outwardly from near the center of the disc. The recording area is composed of a lead-in area, a lead-out area, and a logical space. The lead-in and lead-out areas are located at the inner radius and the outer radius of the disc, respectively. The logical address space is located between the lead-in and lead-out areas for recording logical data. The BD disc also has a special area called BCA (Burst Cutting Area) located inwardly of the lead-in area. BCA is not readable by any application and thus often used for copyright protection.

The logical address space stores file system information (volume) followed by application data such as video data. The file system may be compliant with the UDF (Universal Disk Format) or ISO9660. Similarly to typical personal computers, read access to the stored logical data is made via the directories and files. According to the directory and file structure of this embodiment, the BD has a ROOT directory (ROOT), and a BDVIDEO directory immediately below the ROOT directory. The BDVIDEO directory stores such data as AV contents and management information.

More specifically, the BDVIDEO directory stores files of the following seven types.

A BD.INFO file (fixed file name) contains one of a plurality of pieces of "BD management information" that relates to the entire BD disc. The BD.INFO file is the first file to be read by a BD player.

A BD.PROG file (fixed file name) contains one of a plurality of "BD playback programs" that relates to the entire BD disc.

A XXX.PL file ("XXX" is variable, whereas the extension "PL" is fixed) contains one of the plurality pieces of "BD management information". The piece of BD management information stored therein is PlayList (PlayList) information defining a scenario. Each PlayList is separately contained in one file.

A XXX.PROG file ("XXX" is variable, whereas the extension "PROG" is fixed) contains one of the "BD playback programs" that is associated with one of the PlayLists. A file containing a PlayList and a file containing a BD playback program associated with the PlayList are identified with the file body name (both the files commonly contain "XXX" in the name).

A YYY.VOB file ("YYY" is variable, whereas the extension "VOB" is fixed) contains an MPEG stream, which is one of a plurality of pieces of "AV data". Each of a plurality of VOBs is separately contained in one file.

A YYY.VOBI file ("YYY" is variable, whereas the extension "VOBI" is fixed) contains one of the plurality of pieces of "BD management information" that relates to a VOB, which is a piece of AV data. A file containing a VOB and a file containing a piece of BD management information associated with the VOB are identified with the file body name (both the files commonly contain "YYY" in the name).

A ZZZ.PNG file ("ZZZ" is variable, whereas the extension "PNG" is fixed) contains one of the plurality of pieces of "AV data" that is image data used to constitute subtitles and a menu. The AV data is recorded in the PNG format (PNG is an image format standardized by W3C and is pronounced "ping"). Each PNG image is separately stored in one file.

Figure 2:
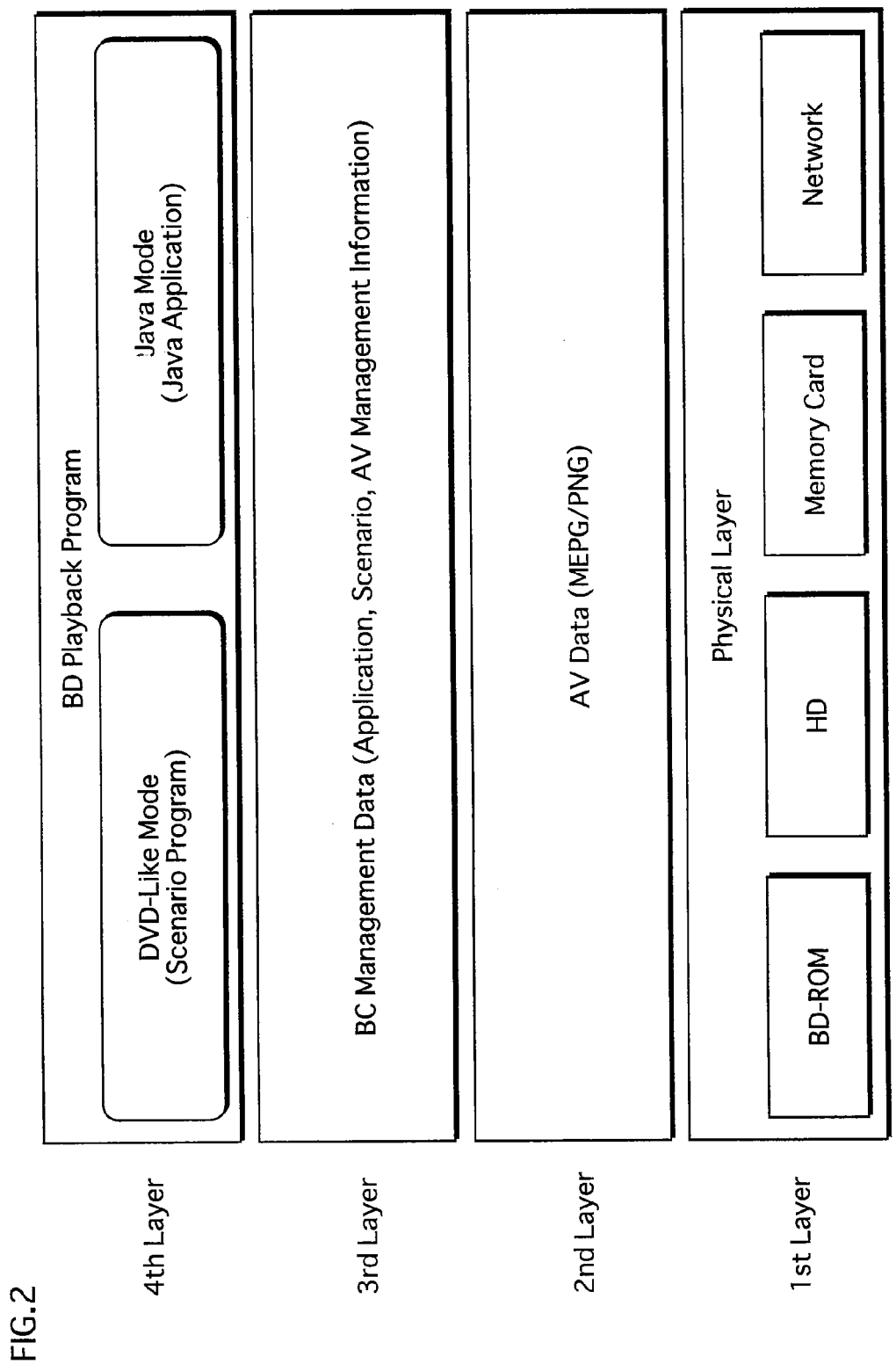
FIG. 2 illustrates a layer model of software for which the BD-ROM is designed.

FIG. 2 illustrates a layer model of playback control. As illustrated in FIG. 2, the first layer is a physical layer and controls supply of a stream to be played. As illustrated on the first layer, a stream to be played is supplied not only from a BD-ROM but also from various recording and communications media including an HD, a memory card, and a network. The first layer controls these sources including the HD, memory card, and network (controls disc access, card access, and network communications).

The second layer is an AV data layer. The second layer defines a decryption method used to decrypt the stream supplied from the first layer.

The third layer (BD management data) defines a static scenario of the stream. The static scenario is a collection of application management information, playback path information, and stream management information that are defined in advance by a creator of the disc. The third layer defines playback control based on the respective pieces of information.

The fourth layer (BD playback program) implements a dynamic scenario of the stream. The dynamic scenario is a program for executing at least either of the AV stream playback procedure or the control procedure relating to AV stream playback. Playback control according to the dynamic scenario varies in response to a user operation made to the playback device. In this respect, the dynamic scenario is said to be more like a program in nature. In this embodiment, the dynamic playback control is executed in two modes. One of the modes is a mode of executing playback of video data recorded on the BD-ROM in an environment specific to AV devices (DVD-like mode). The other mode is a mode of adding value to the video data recorded on the BD-ROM (Java mode). These two modes, which are the DVD-like mode and the Java mode, are illustrated on the fourth layer in FIG. 2. The DVD-like mode is a mode of executing playback in an environment. In the DVD-like-mode, a scenario program defining a scenario for dynamically changing progress of playback is executed. On the other hand, the Java mode is a playback mode in which a Java virtual machine is an execution entity and playback control is executed by a Java application.

Figure 3:
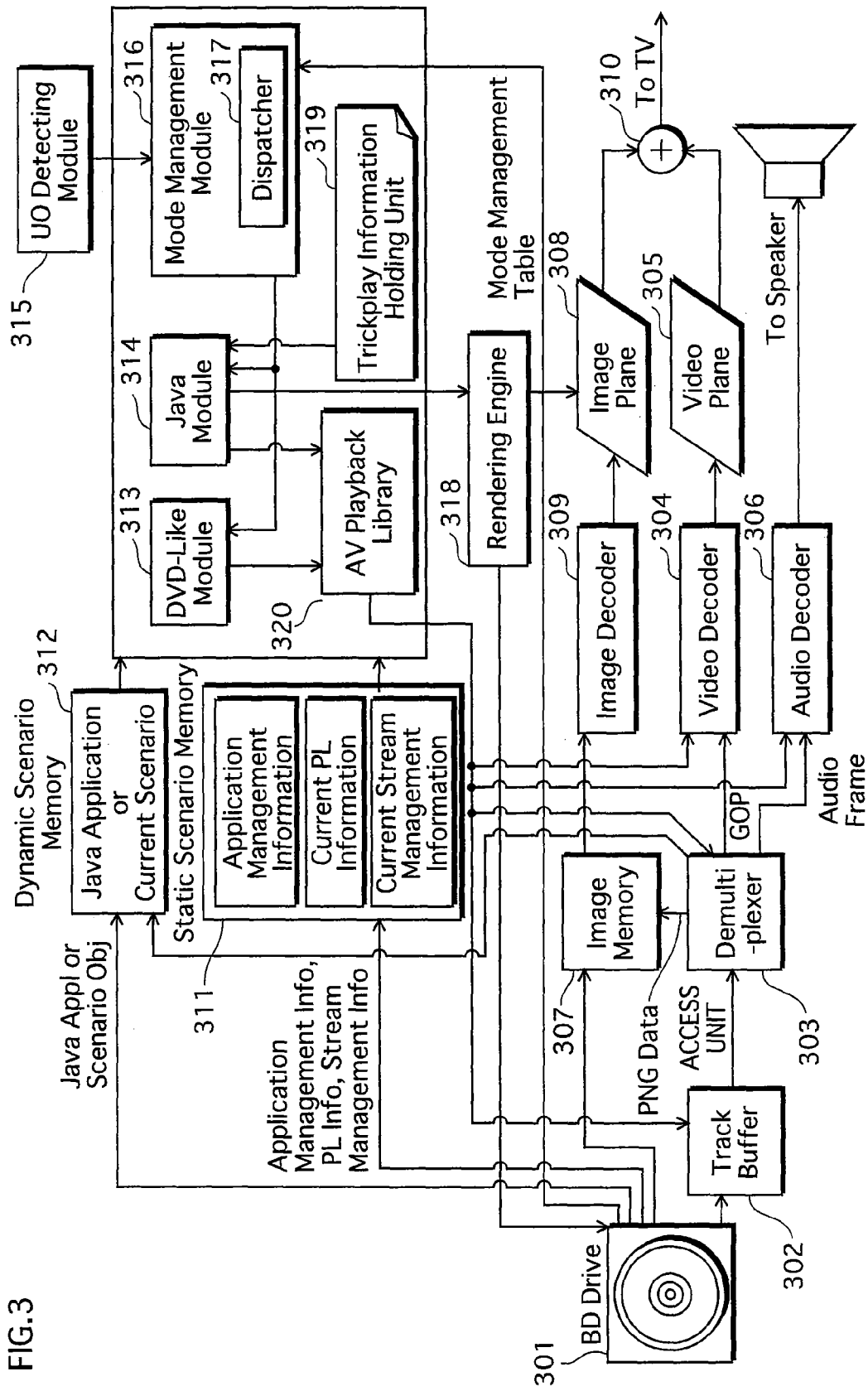
FIG. 3 illustrates an internal structure of a playback device according to a first embodiment of the present invention.

FIG. 3 is a block diagram roughly illustrating the structure of a playback device. As illustrated in FIG. 3, the playback device is composed of a BD-ROM drive 301, a track buffer 302, a demultiplexer 303, a video decoder 304, a video plane 305, an audio decoder 306, an image memory 307, an image plane 308, an image decoder 309, an adder 310, a static scenario memory 311, a dynamic scenario memory 312, a DVD-like module 313, a Java module 314, a UO detecting module 315, a mode management module 316, a dispatcher 317, a rendering engine 318, a trickplay information holding unit 319, and an AV playback library 320.

The BD-ROM drive 301 loads/ejects a BD-ROM and accesses data stored on the BD-ROM.

The track buffer 302 is an FIFO memory. Access Units read from the BD-ROM are stored into the track buffer 302 and taken out in first-in-first-out order.

The demultiplexer 303 extracts Access Units from the track buffer 302 and demultiplexes the extracted Access Units into video frames constituting GOPs and audio frames. The resulting video frames are supplied to the video decoder 304 and the resulting audio frames are supplied to the audio decoder 306. A secondary video stream is stored into the image memory 307, whereas navigation button information is stored into the dynamic scenario memory 312. Demultiplexing by the demultiplexer 303 involves conversion of TS packets into PES packets.

The video decoder 304 decodes the video frames supplied from the demultiplexer 303 and writes uncompressed pictures on the video plane 305.

The video plane 305 is memory for storing uncompressed pictures.

The audio decoder 306 decodes the audio frames supplied from the demultiplexer 303 to output uncompressed audio data.

The image memory 307 is a buffer for storing the secondary video stream read from the BD-ROM, PNG data included in navigation button information, and image files.

The image plane 308 is a memory having an area worth one screen. Expanded data of the secondary stream, PNG data, and image file are presented on the image plane 308.

The image decoder 309 expands the secondary video stream, PNG data, image file stored in the image memory 307 and writes the resulting data onto the image plane 308. By decoding the secondary video stream, various menus and secondary video appear on the display screen.

The adder 310 overlays the image expanded on the image plane 308 on the uncompressed picture data stored on the video plane 305. As a result, a composite image is made and output.

The static scenario memory 311 is memory for storing application management information, a current PL, and current stream management information. The application management information is recorded on the BD-ROM. The current PL refers to one of the plurality of PLs recorded on the BD-ROM that is currently being executed. The current stream management information refers to one of the plurality of pieces of stream management information recorded on the BD-ROM that is currently being executed.

The dynamic scenario memory 312 is memory for storing the current dynamic scenario and used by the DVD-like module 313 and the Java module 314. The current dynamic scenario refers to one of the plurality of scenarios recorded on the BD-ROM that is currently being executed.

The DVD-like module 313 is a virtual DVD player that is an execution entity of the DVD-like mode and executes the current scenario program loaded to the dynamic scenario memory 312.

The Java module 314 is a Java platform and is composed of a Java virtual machine, configuration, and profile. The Java virtual machine includes a class loader. The Java module 314 creates and executes a current Java object from a Java class file loaded to the dynamic scenario memory 312. The Java virtual machine converts a Java object written in the Java language into native code of the CPU of the playback device and causes the CPU to execute the Java object.

The UO detecting module 315 detects a user operation made on the remote controller or the front panel of the playback device. Upon detection, the UO detection module 315 outputs information indicative of the detected user operation (hereinafter, referred to simply as "UO (User Operation)") to the mode management module 316.

The mode management module 316 holds a mode management table read from the BD-ROM and executes mode management and branch control. The mode management executed by the mode management module 316 is to assign either of the DVD-like module 313 and the Java module 314 to execute the dynamic scenario.

The dispatcher 317 selectively passes UOs appropriate for the current mode of the playback device to the module that is assigned to execute the current mode. Suppose, for example, UOs of UP, DOWN, RIGHT, LEFT, and ACTIVATE are received during execution of the DVD-like mode, the dispatcher 317 outputs the received UOs to the module to which execution of the DVD-like mode is assigned.

The rendering engine 318 is provided with base software such as Java2D and OPEN-GL. The rendering engine 318 renders computer graphics according to instructions given by the Java module 314 and outputs the rendered computer graphics to the image plane 308.

The trickplay information holding unit 319 stores a list of playback rates that the playback device supports for executing trickplay and also stores information about trickplay functions available in the DVD-like mode. The list and information are referenced by the Java module for ensuring compatibility with the DVD-like mode during trickplay executed in the Java mode.

The AV playback library 320 executes AV playback functionality and PlayList playback functionality in response to a function call from the DVD-like module 313 and the Java module 314. The AV playback functionality refers to a group of functions similar to functions of DVD and CD players. Specifically, the functions include playback start, stop, pause, resume, cancellation of still image function, fast-forward playback at the playback rate specified with an immediate value, reverse playback at the playback rate specified with an immediate value, audio change, secondary stream change, and angle change. The PlayList playback function refers to a type of AV playback function with which playback starts and stops according to PlayList information. The AV playback library 320 varies the reading rate at which data is read from the track buffer 302, according to a playback rate that is specified with an immediate value by the DVD-like module 313 and the Java module 314. The AV playback library 320 then controls the demultiplexer 303 to extract video data at the varied reading rate and sends the extracted video data to the video decoder 304. In a similar manner, the AV playback library 320 controls the demultiplexer 303 to extract audio data and sends the extracted audio data to the audio decoder 306. Through the above processing, trickplay is executed at the playback rate specified with an immediate value.

This concludes the description of the components of the playback device.

Figure 4:
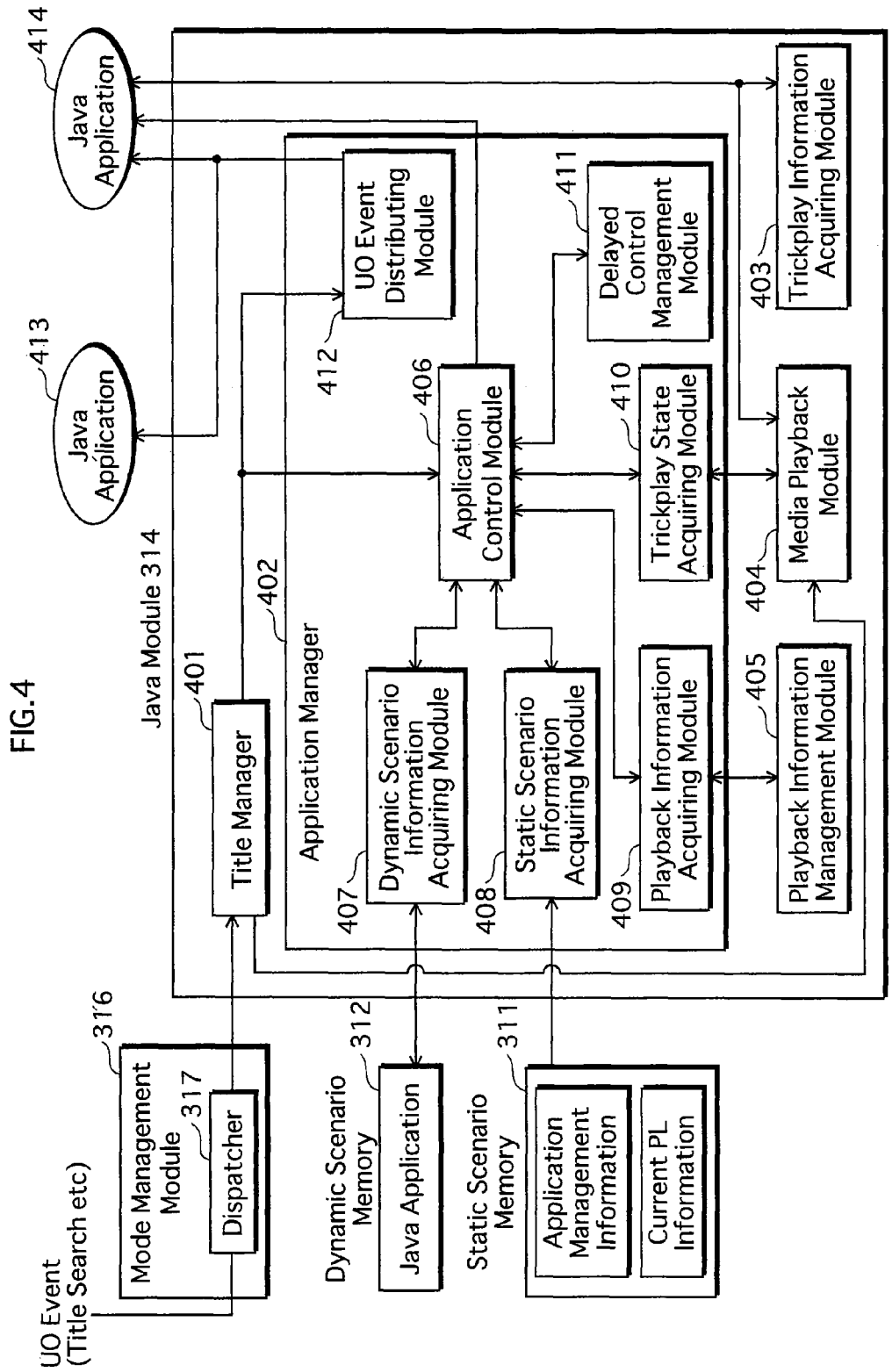
FIG. 4 is a block diagram illustrating a structure of the playback device relating to execution control of applications performed in response to a user operation of selecting a title.

Next, FIG. 4 is a block diagram illustrating the detailed structure of the Java module 314. The structure illustrated in the figure relates to execution control of applications performed in response to a user operation of selecting a title.

In response to a user operation relating to a title selection, the dispatcher 317 requests the title manager 401 to select a title corresponding to the input numeral.

The title manager 401 requests the media playback module 404 to execute AV playback and also requests the application control module 406 to activate an application.

In response to an activation request from the title manager 401, the application control module 406 controls behavior of the Java applications 413 and 414 acquired from the dynamic scenario acquiring module 407. The control is executed based on application management information, application state, and timing information. The application management information is acquired from the static scenario acquiring module 408. The application state and timing information are acquired from the delayed control management module 411.

The dynamic scenario acquiring module 407 acquires a Java application from the dynamic scenario memory 312. In accordance with instructions given from the application control module 406, the dynamic scenario acquiring module 407 stores a Java application from the BD-ROM into the dynamic scenario memory 312 and releases the Java application from the dynamic scenario memory 312.

The static scenario acquiring module 408 acquires, from the static scenario memory 311, application management information for controlling behavior of the Java application.

The playback information acquiring module 409 acquires playback information from the playback information management module 405 and receives an event when a change is made to the playback information.

A trickplay state acquiring module 410 receives, as the trickplay state, events relating to trickplay start, trickplay execution, and trickplay end from the media playback module 404.

The delayed control management module 411 stores the activation attribute of an application in accordance with transition between titles at the time of a title selection. In addition, the delayed control management module 411 performs time management at the time of delayed activation. The delayed activation refers to a process of activating an application associated with a user-selected title with a delay, rather than immediately upon receipt of an activation request. The activation request is issued by the application control module 406 in response to a title selection by the user. The length of delay refers to a time period for which activation of the application is delayed. Specifically, the delayed control management module 411 includes a timer.

The UO event distributing module 412 passes a UO event received by the title manager 401 to a Java application.

<Data>

FIG. 5 illustrates an example of application management information. As illustrated in FIG. 5, the application management information is composed of an application ID 501, an activation attribute 502, and a BIND attribute 503.

The application ID 501 is an identifier of an application.

The activation attribute 502 indicates whether a corresponding application is to be activated upon start of an associated title (AutoStart) or not to be activated upon start of the title (Present).

The BIND attribute 503 indicates whether a corresponding application is allowed to be executed continuously beyond a transition between adjacent titles. An application having the BIND attribute of "bound" is terminated when a new title is selected. On the other hand, an application having the BIND attribute of "unbound" is allowed to be continuously executed even after a title selection.

Next, FIG. 6 illustrates an example of application activation state management information. As illustrated in FIG. 6, the application activation state management information is composed of an application ID 501 and an application activation state 601.

The application activation state 601 indicates either of "AutoStart" and "Present". The "AutoStart" state indicates that a corresponding application is to be automatically activated after an associated title is selected. On the other hand, the "Present" state indicates that the application is neither activated nor terminated automatically after title selection. An application with the "Present" state is activated by another application or in response to an event such as a user operation.

Figure 7:
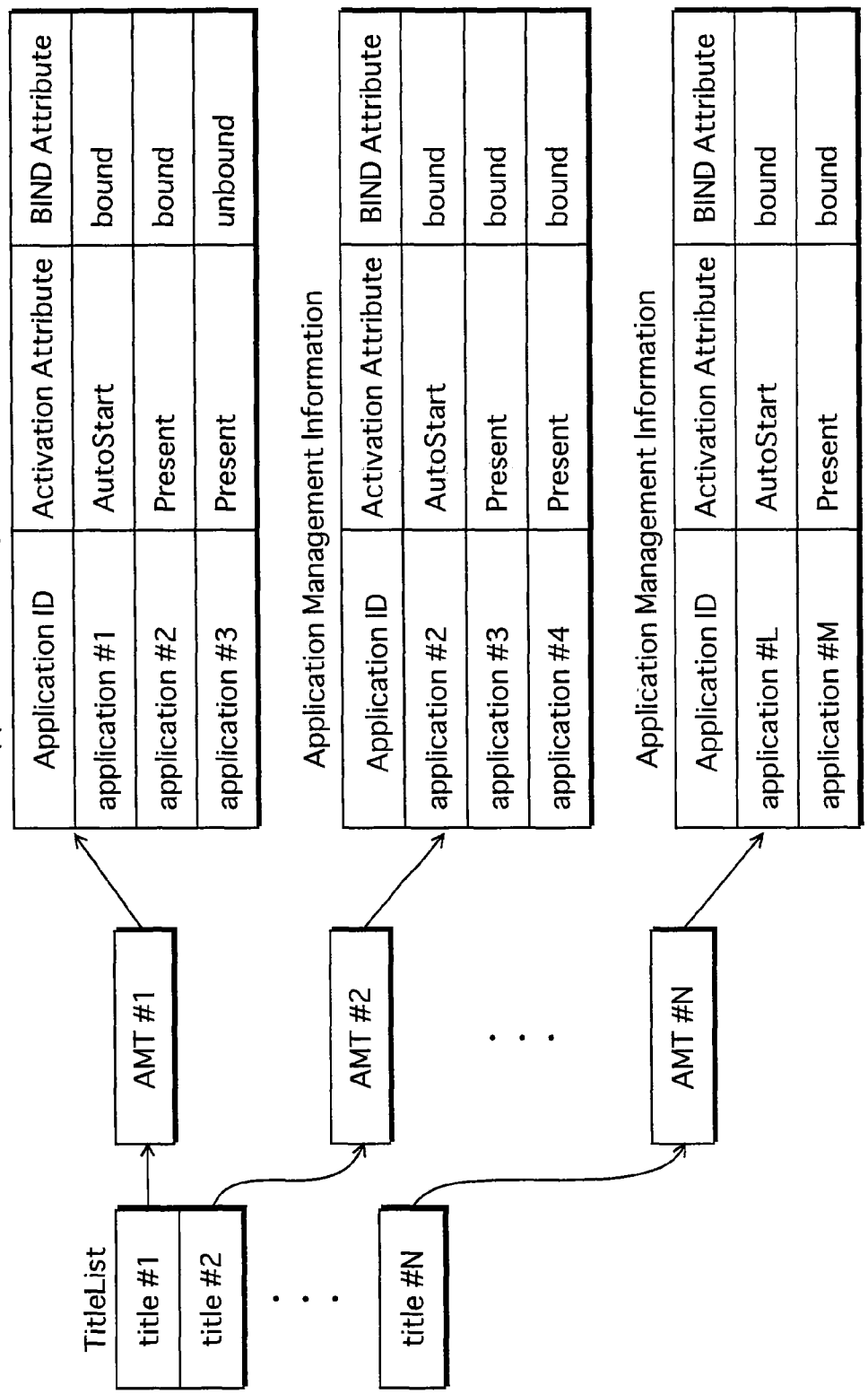
FIG. 7 illustrates an example in which each of a plurality of titles is provided with a different piece of application management information.

FIG. 7 illustrates an example in which each of a plurality of titles is provided with a different piece of application management information. An application management table (hereinafter, referred to as "AMT") is a table containing a piece of application management information. In this case, each time a new title is selected, the application manager 402 acquires a corresponding piece of application management information from the title manager 401. With this arrangement, operations of applications are appropriately controlled in accordance with video playback.

<Operations>

Figure 8:
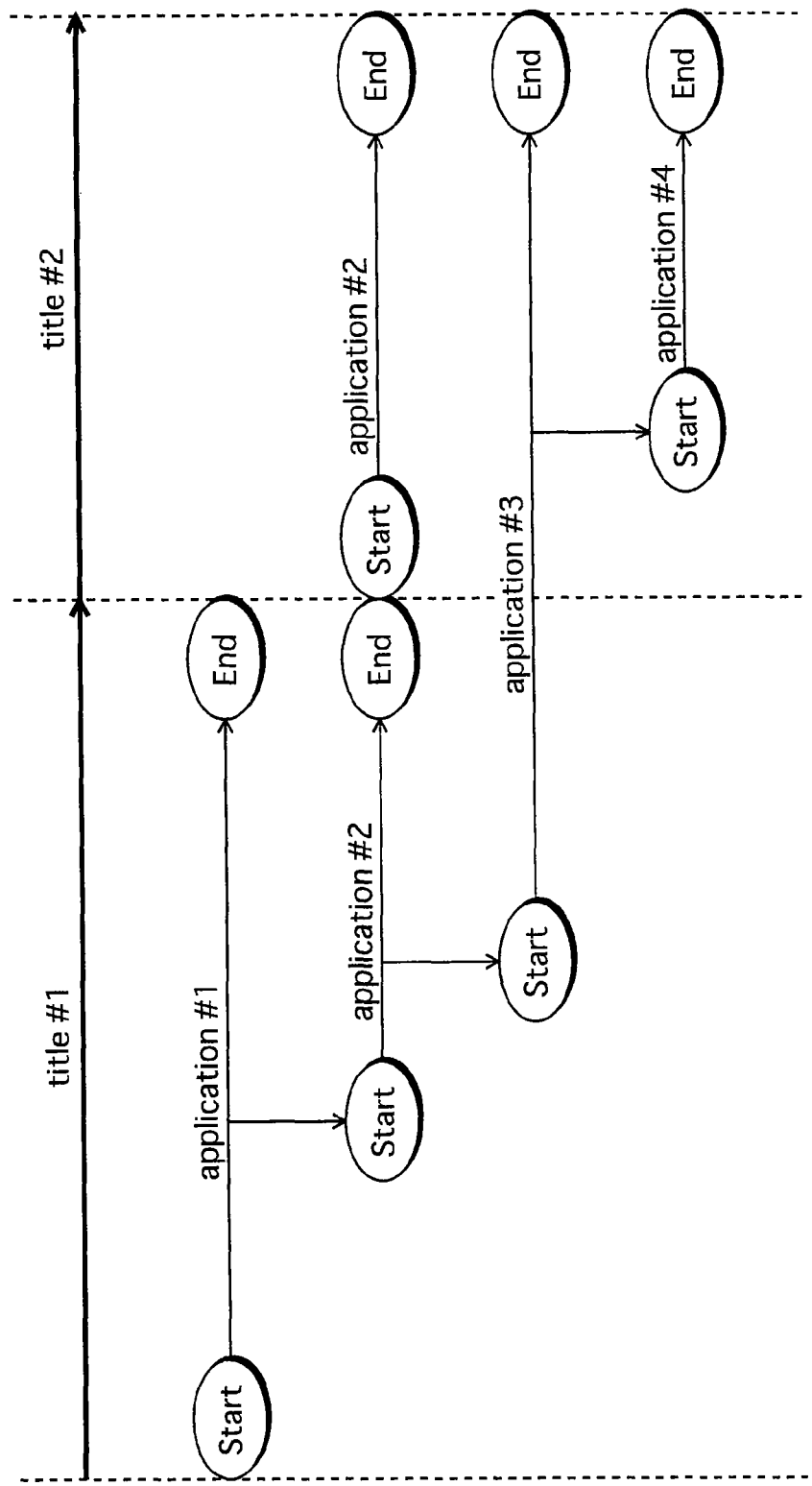
FIG. 8 illustrates applications executed in accordance with a title transition.

FIG. 8 illustrates an example of application execution when normal playback of Title #1 and Title #2 are sequentially executed based on the application management information illustrated in FIG. 7. In this example, it is supposed that each application having the "Present" attribute is activated by another application. Upon playback start of Title #1, Application #1 having the "AutoStart" attribute is activated according to a corresponding piece of application management information. Then, Application #2 is activated by Application #1, and Application #3 is activated by Application #2. When Title #2 is selected next, Applications #1 and #2 having the BIND attribute of "bound" are terminated according to the application management information of Title #1. Yet, Application #3 having the "unbound" attribute is continuously executed even during the title selection process. Upon playback start of Title #2, Application #2 associated with Title #2 and having the AutoStart attribute is activated and Application #3 remains in execution. Then, Application #4 is activated by Application #3. Upon playback end of Title #2, Applications #2, #3, and #4 having the "bound" attribute are terminated in accordance with a piece of application management information corresponding to Title #2.

Note that an application having the "Present" attribute may be activated in response to an event such as a user operation.

Figure 9:
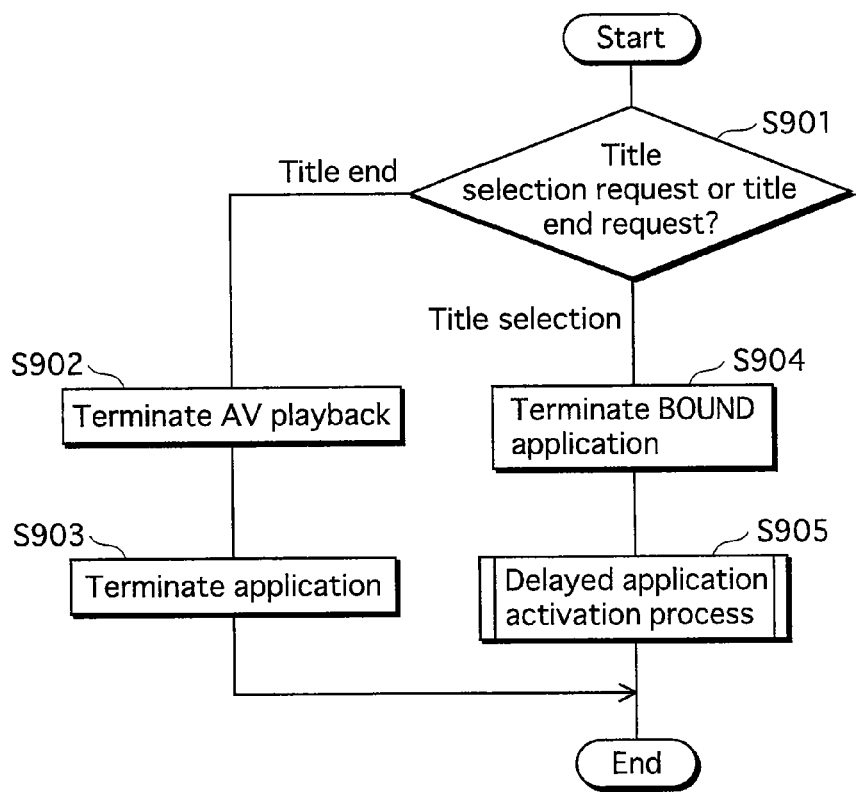
FIG. 9 is a flowchart of processing steps performed for execution control of applications in response to a title search.

FIG. 9 illustrates an example of a flowchart of processing steps performed by the title manager 401 and the application control module 406 when a title selection request or a title end request is received from the mode management module 316.

Upon receipt of a request from the mode management module, the title manager 401 judges whether the received request is a title selection request or a title end request (Step S901). If the received request is a title end request, the title manager 401 requests the media playback module 404 to terminate AV playback. Upon receipt of the request, the media playback module 404 terminates AV playback (Step S902). Next, the title manager 401 requests the application control module 406 for application termination. Upon receipt of the request, the application control module 406 terminates all the application currently being executed (Step S903). On the other hand, if the received request is a title selection request, the title manager 401 requests the application control module 406 to terminate each application having the "bound" attribute. Upon receipt of the request, the application control module 406 terminates all the "bound" applications being executed (Step S904). Then, the application control module 406 executes a delayed application activation process (Step S905).

Figure 10:
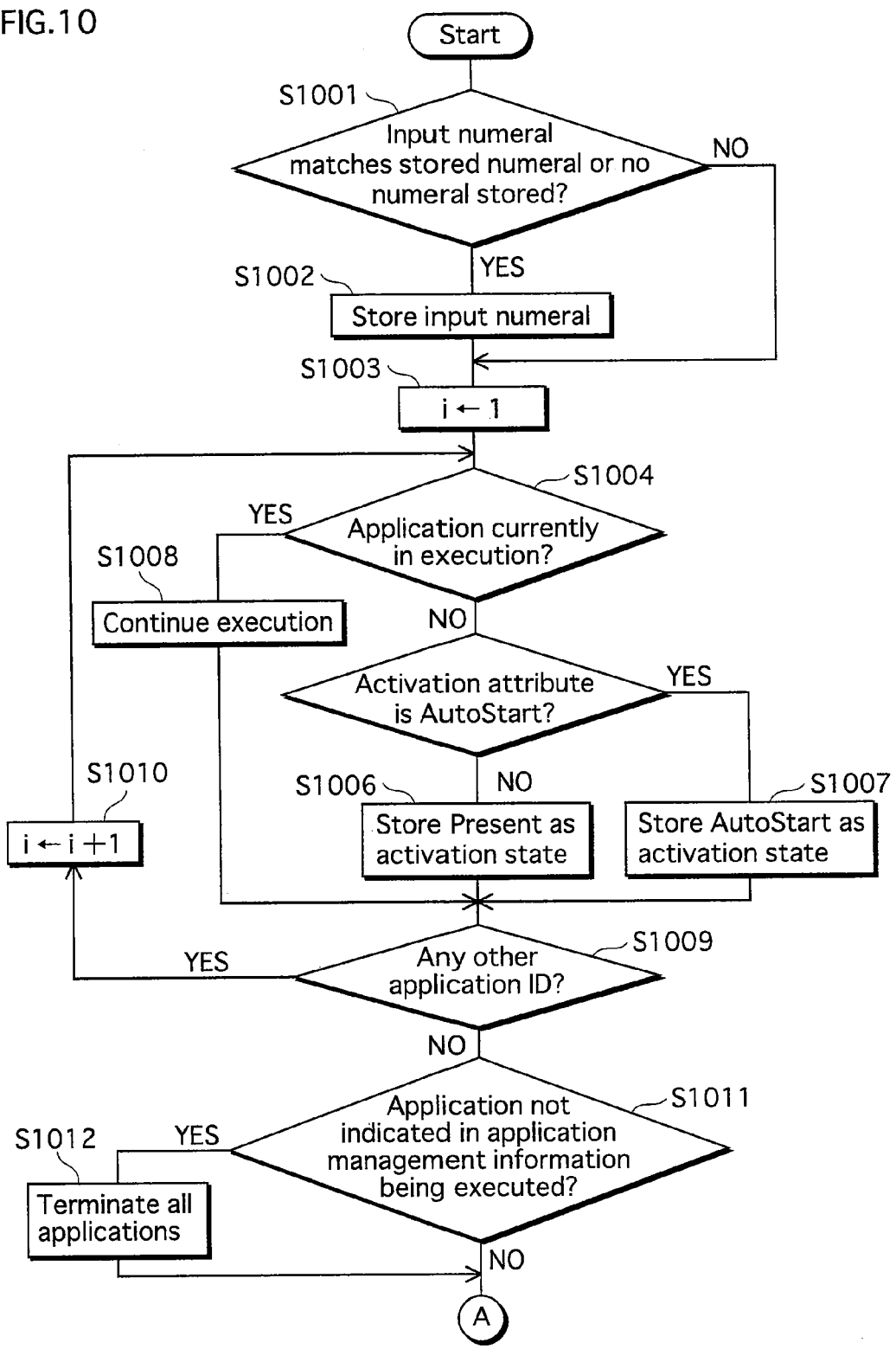
FIG. 10 is a flowchart of a delayed application activation process.
Figure 11:
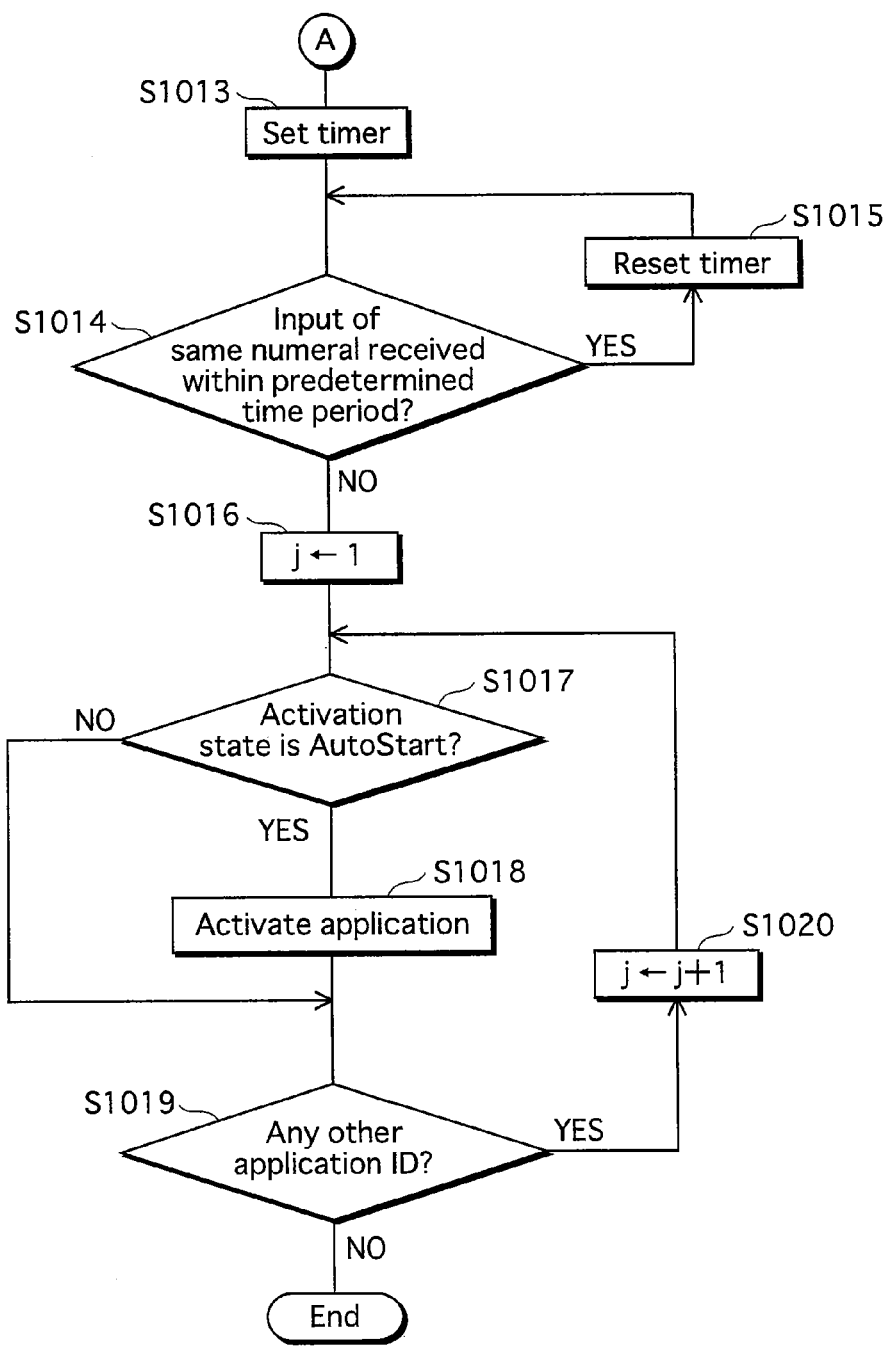
FIG. 11 is a flowchart of the delayed application activation process.

Next, FIGS. 10 and 11 illustrate flowcharts of processing steps of the delayed application activation process illustrated in FIG. 9. In the flowcharts, the letter "i" represents a variable specifying one of application IDs indicated in the application management information, whereas the letter "j" represents a variable specifying one of application IDs indicated in the application activation state management information. First of all, it is judged whether an input numeral matches a stored numeral or no numeral is stored (Step S1001). If it is judged that the input numeral does not match the stored numeral or no numeral is stored, the input numeral is stored (Step S1002). On the other hand, if the input numeral matches the stored numeral, the variable "i" is initialized (Step S1003). The variable "i" is initialized also after the input numeral is stored. Then, it is judged whether the application identified by the application ID specified by the variable "i" is currently being executed (Step S1004). If the application is not currently in execution, it is then judged whether the activation attribute corresponding to the application ID is "AutoStart" (Step S1005). If the activation attribute is not "AutoStart", the application activation state of "Present" is stored in the delayed control management module 411 (Step S1006). On the other hand, if the activation attribute is "AutoStart", the application activation state of "AutoStart" is stored into the delayed control management module 411 (Step S1007). If it is judged in Step S1004 that the application is currently being executed, execution of the application is continued (Step S1008). After the above steps, it is judged whether the application management information indicates any other application ID (Step S1009). If any other application ID is indicated, the variable "i" is incremented by one (Step S1010) and Step S1004 is performed next. On the other hand, if no other application ID is indicated, it is judged whether any application having an application ID not indicted in the application management information is currently being executed (Step S1011). If such applications is being executed, the applications are all terminated (Step S1012). Then, the timer for measuring the predetermined time period is set (Step S1013). It is judged whether an input of the same reference numeral as the stored numeral is received within the predetermined time period (Step S1014). If the same reference numeral is received within the predetermined time period, the timer is reset (Step S1015) and Step S1014 is performed next. Next, the variable "j" is initialized (Step S1016). It is then judged whether or not the activation state of the application corresponding to the application ID specified by the variable "j" is "AutoStart" (Step S1017). If the activation attribute is "AutoStart", the application is activated (Step S1018). It is then judged whether the application activation state management information indicates any other application ID (Step S1019). If any other application ID is indicated, the variable "j" is incremented by one (Step S1020) and Step S1017 is performed next. If no other application ID is indicated, the process is terminated.

Note that in the flowchart above, it is judged whether an input of the same reference numeral as a stored numeral is received. Yet, it is not necessary to limit the judgment as to the input of the same reference numeral. For example, it is applicable to reset the timer also when it is judged that an input for selecting another title is made within the predetermined time period. In this case, if no further input is made within the predetermined time period, an application program is activated according to the most recently received input.

Figure 12:
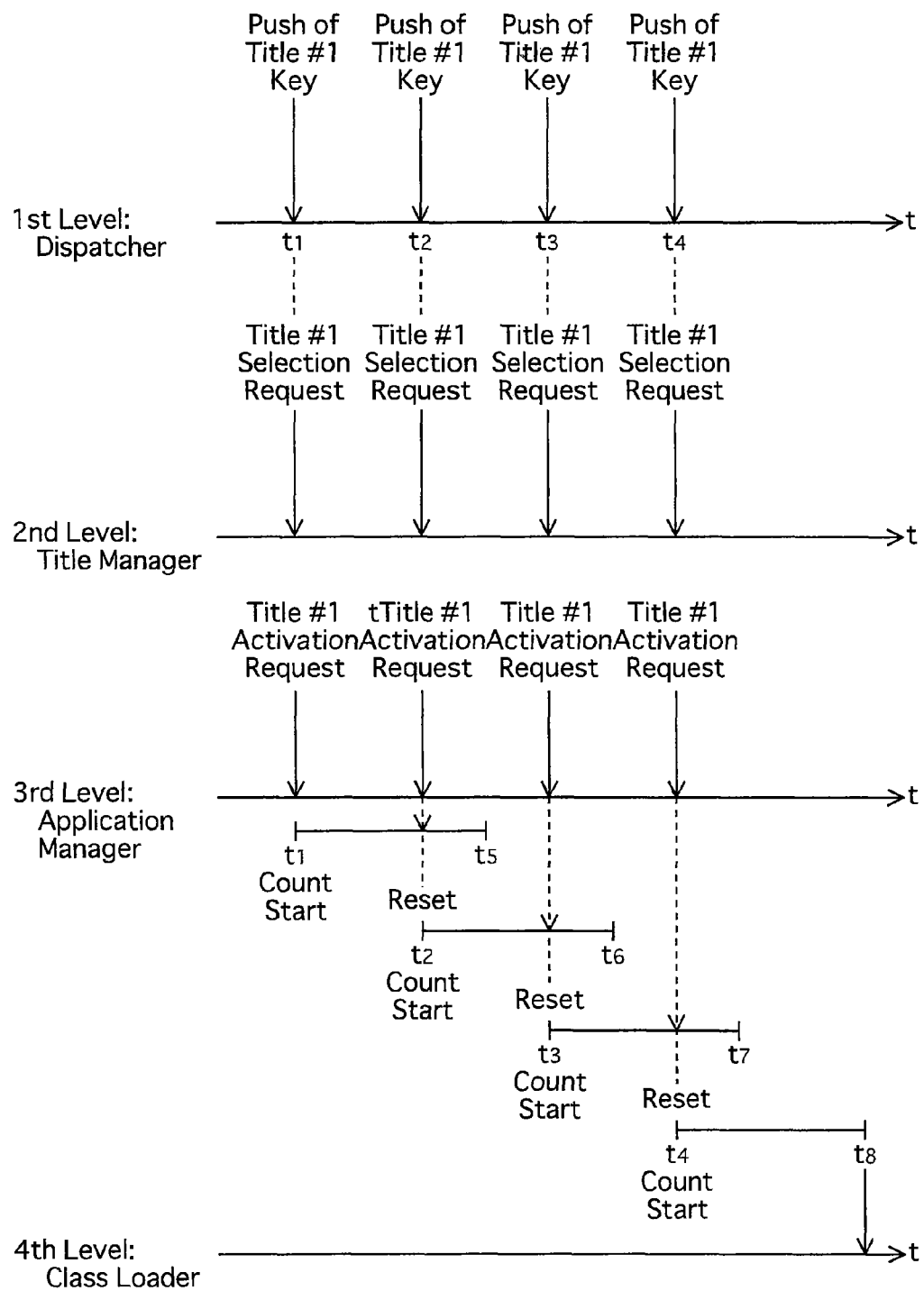
FIG. 12 is a timing chart illustrating an example of user inputs and operations of the playback device.

Next, with reference to FIG. 12, a specific description is given of a delayed application activation process of an application. The delayed application activation process is performed when the same input is made a plurality of number of times in succession. In FIG. 12, the first level indicates the dispatcher. The second level indicates the title manager. The third level indicates the application manager. The fourth level indicates the class loader. The lateral axis of each level represents time. Each of time periods from time $t_1$ to $t_5$, time $t_2$ to $t_6$, time $t_3$ to time $t_7$, and time $t_4$ to $t_8$ corresponds to the predetermined time period. At time $t_1$, the user makes a key input on the remote controller for selecting Title #1. In response, the dispatcher requests the title manager to select Title #1. Upon receipt of the request, the title manager requests the application manager to activate Title #1. Upon receipt of the request, the application manager sets the timer to judge whether another input for selecting the same title is made within the predetermined time period, rather than immediately issuing an instruction to the class loader. At time $t_2$, another input for selecting Title #1 is received. Thus, the application manager resets the timer to judge whether yet another input for selecting the same title is made within the predetermined time period. At time $t_3$, yet another input for selecting Title #1 is made. Thus, the application manger resets the timer again to judge whether yet another user input for selecting the same title is made within the predetermined time period. At time $t_4$, yet another user input for selecting Title #1 is made. Thus, the application manger resets the timer again to judge whether yet another user input for selecting the same title is made within the predetermined time period. Since no further input selecting the same title is made within the predetermined time period, the application manager issues at time $t_8$ an instruction to the class loader according to the most-recently received input (input made at time $t_4$).

Next, FIG. 13 illustrates an example of PlayList management information that allows the Java module, rather than by an application, to automatically start AV playback in response to title selection. The PlayList management information is composed of an auto-playback flag 1301 and a PlayList name 1302.

The auto-playback flag is set to either "ON" or "OFF". When set to "ON", playback of the first PlayList indicated in the PlayList name 1302 is automatically executed by the Java module. On the other hand, when the auto-playback flag is set to "OFF", playback of PlayList indicated in the PlayList name 1302 is not automatically executed by the Java module. Rather, the PlayList playback is executed by an application.

The PlayList name 1302 indicates a list of one or more PlayLists that are executable during playback of a corresponding title.

Figure 14:
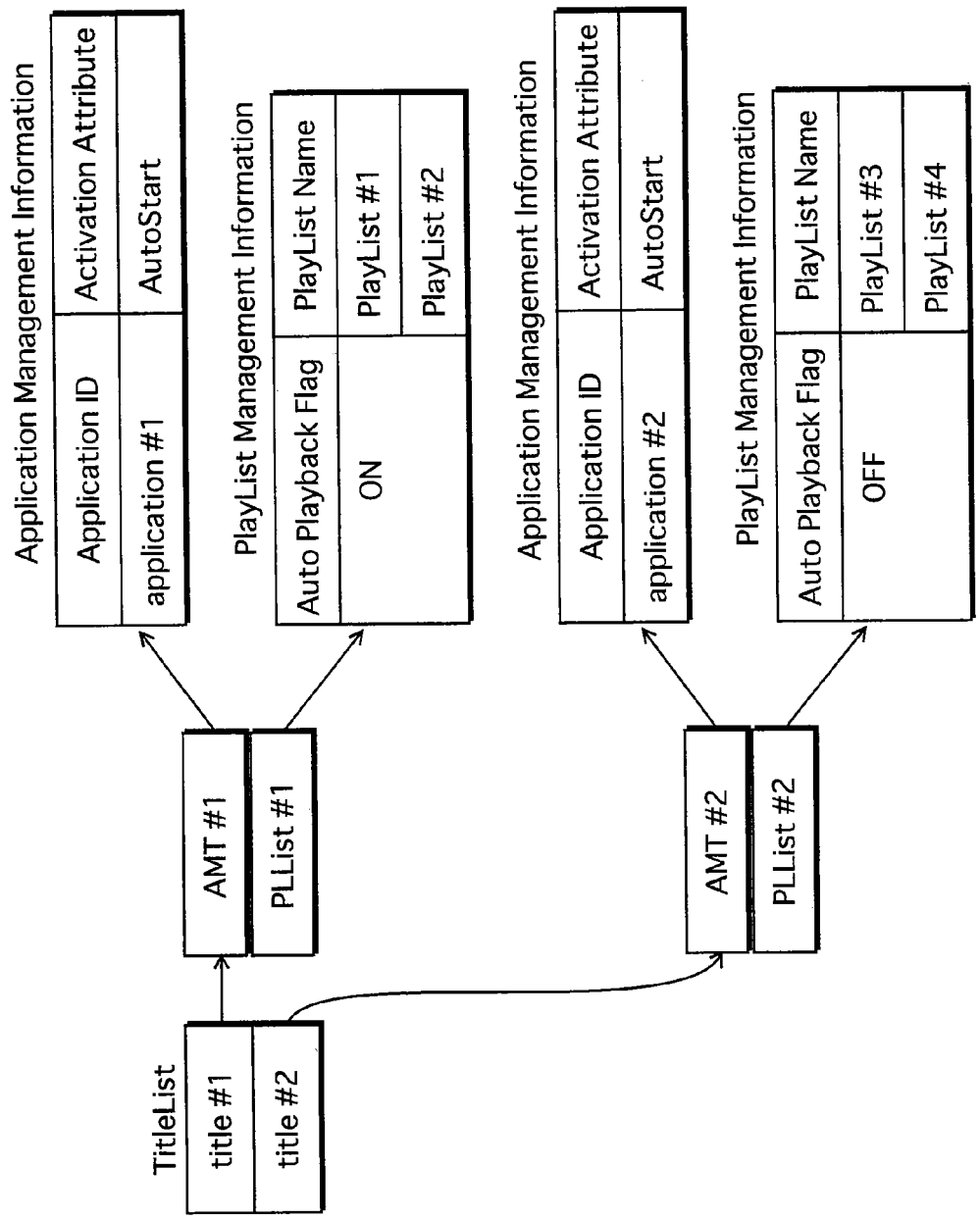
FIG. 14 illustrates an example in which each title is provided with a different piece of PlayList management information and a different piece of application management information.

Next, FIG. 14 illustrates an example in which each title is provided with a different piece of PlayList management information as well as a different piece of application management information. Provision of different pieces of PlayList management information for respective titles makes it possible to limit PlayLists usable in the respective titles. In addition, PlayList playback is enabled to automatically start when a corresponding title is selected.

Figure 15:
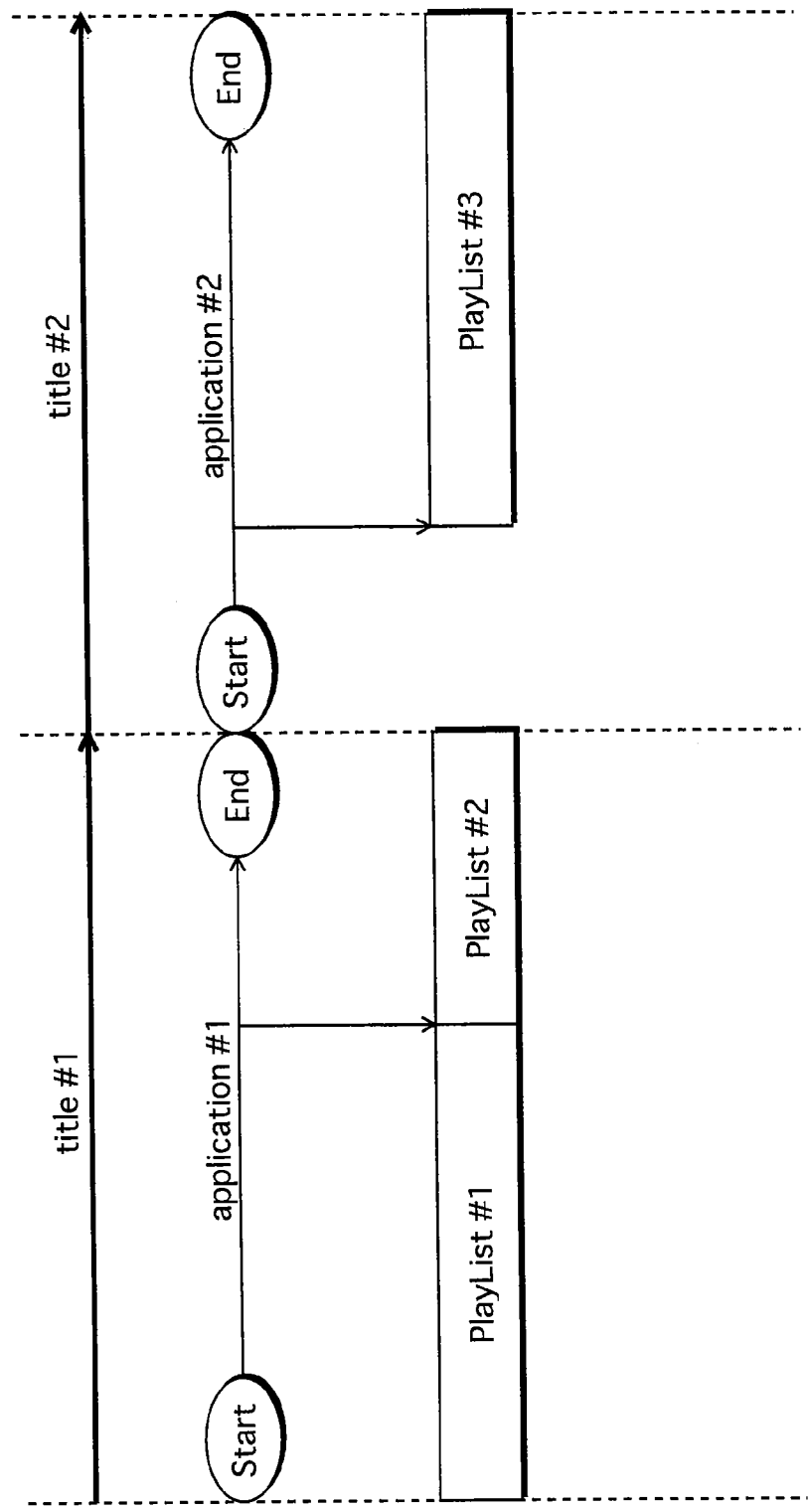
FIG. 15 illustrates applications and PlayList playback executed in accordance with a title transition.

FIG. 15 illustrates application operations and PlayList playback executed based on the application management information and PlayList management information illustrated in FIG. 14 when Titles #1 and #2 are sequentially selected for normal playback. At the playback start of Title #1, Application #1 having the "AutoStart" attribute is activated according to the application management information. Since the PlayList management information indicates that the auto-playback flag is "ON", playback of PlayList #1, which is the first PlayList indicted in the PlayList management information, is automatically executed. Other PlayLists are executed if a playback request is received from an application or an event such as a user operation is received. For example, Play- List #1 is switched to PlayList #2 if Application #1 currently being executed requests a PlayList change. At the playback start of Title #2, Application #2 associated with Title #2 and having the "AutoStart attribute" is activated, and Application #1 that is associated only with Title #1 is terminated. Since the piece of PlayList management information corresponding to Title #2 indicates that the auto-playback flag is set to "OFF". Thus, no PlayList playback is automatically executed. Playback of PlayList #3 is started at a request by Application #2. Playback of Title #2 ends when Application #2 and PlayList #3 end.

Figure 16:
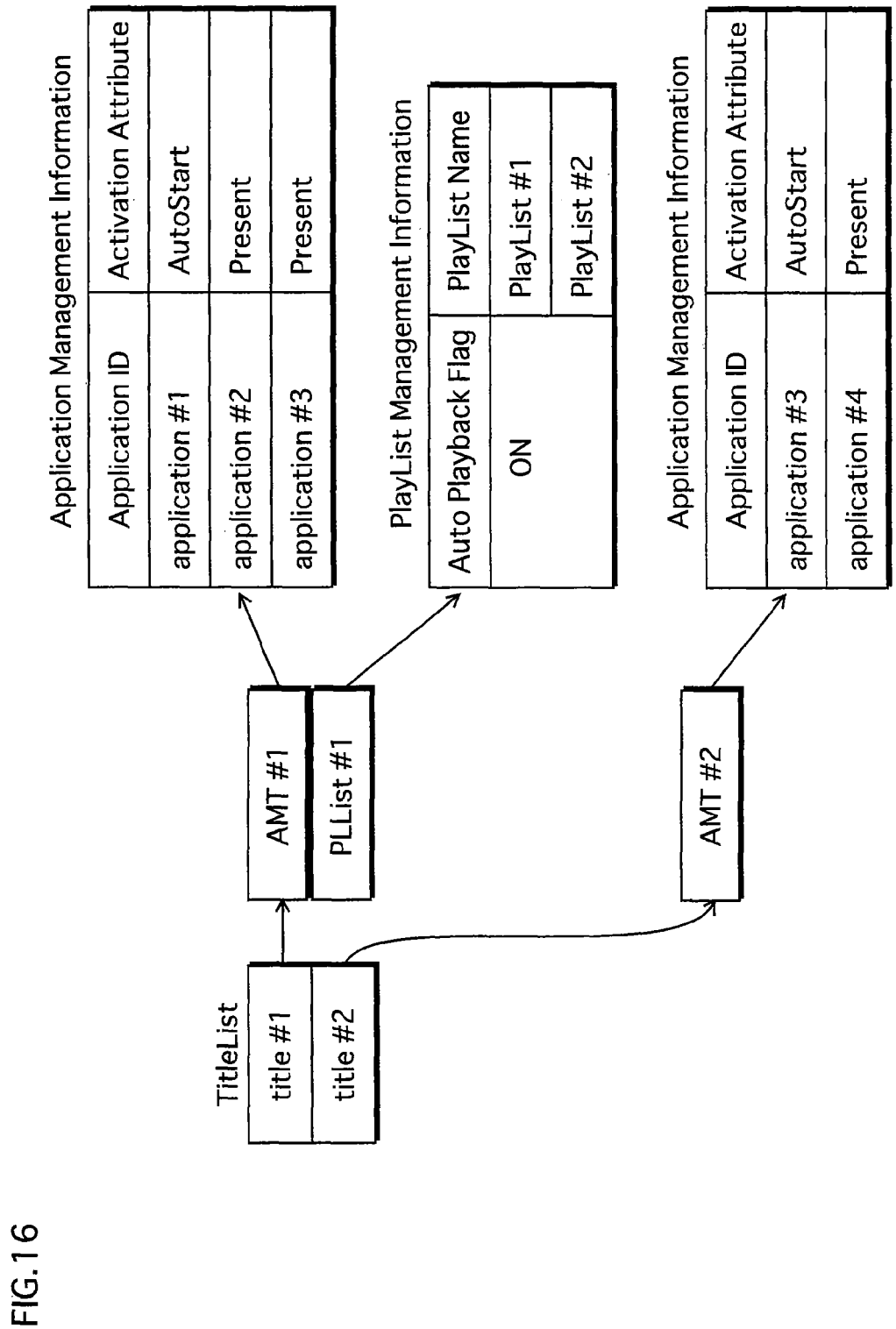
FIG. 16 illustrates an example in which each title is provided with a different piece of PlayList management information and a different piece of application management information.

Next, FIG. 16 illustrates an example in which one title is provided with both application management information and PlayList management information, whereas another title is provided with application management information only. Provision of both types of titles (one having both application management information and PlayList management information and the other having application management information only) makes it possible to provide a title in which AV data and an application coexist and a title composed only of an application. Examples of such a title composed only of an application includes a game.

Figure 17:
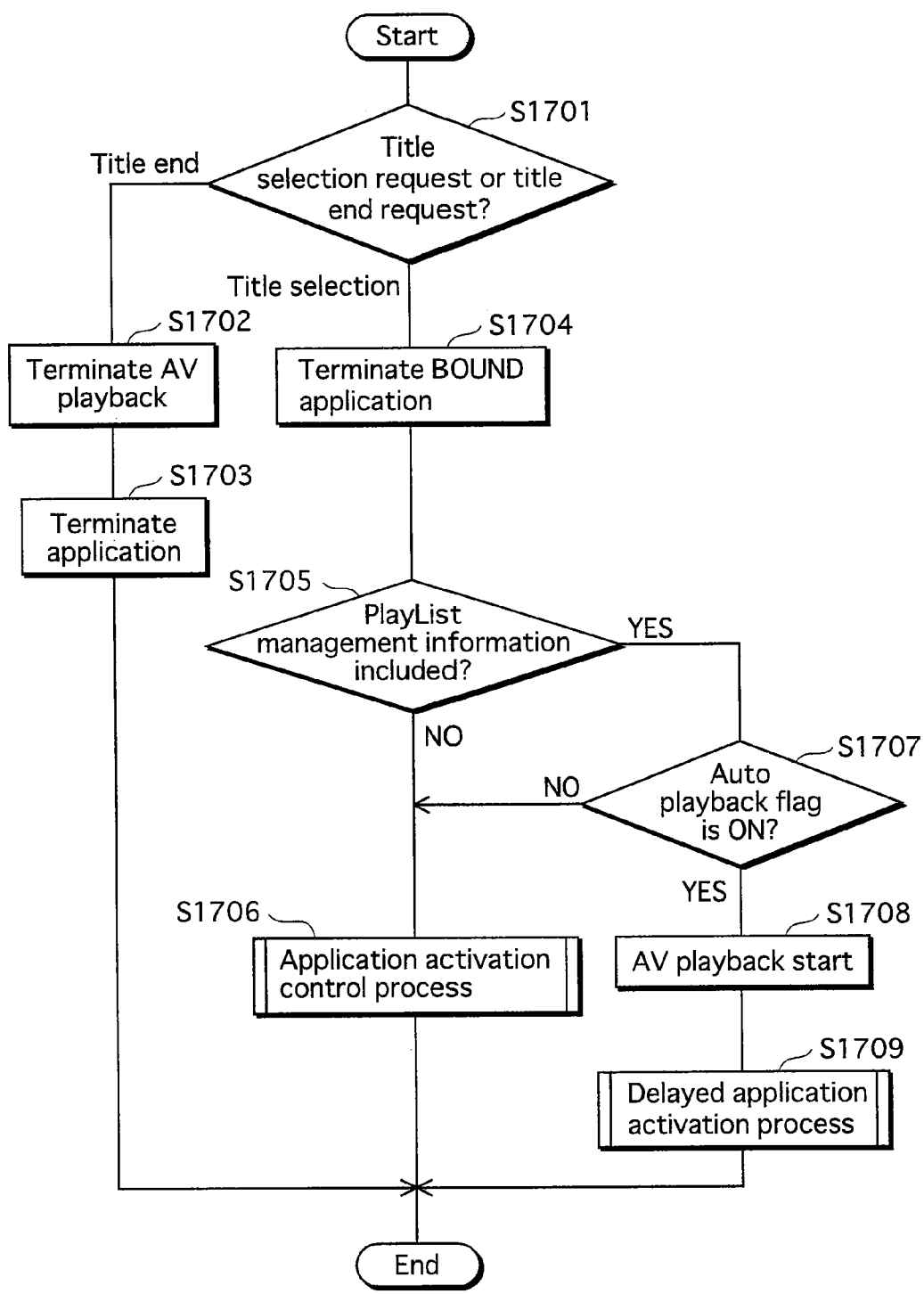
FIG. 17 is a flowchart of processing steps performed in response to a title search for execution control of applications according to PlayList management information.

FIG. 17 is an exemplary flowchart of processing steps performed by the title manager 401 and the application control module 406 upon receipt of a title selection request or a title end request from the mode management module 316. In this example, it is supposed that the selected title is provided with PlayList management information.

Upon receipt of a title selection request or a title end request from the mode management module 316, the title manager 401 judges which of the requests is received (Step S1701). If the received request is a title end request, the title manager 401 requests the media playback module 404 to terminate AV playback. Upon receipt of the request, the media playback module 404 terminates AV playback (Step S1702). In addition, the title manager 401 requests the application control module 406 to terminate applications. Upon receipt of the request, the application control module 406 terminates all the applications that are currently being executed (Step S1703). On the other hand, if the received request is a title selection request, the title manager 401 requests the application control module 406 to terminate all the "bound" applications. Upon receipt of the request, the application control module 406 terminates all the "bound" applications currently being executed (Step S1704). The title manager 401 then judges whether the selected title is provided with PlayList management information (Step S1705). If the selected title is not provided with PlayList management information, the title manager 401 requests the application control module 406 to activate applications. Upon receipt of the request, the application control module 406 performs an application activation control process (Step S1706). If the selected title is provided with PlayList management information, on the other hand, it is then judged whether the auto-playback flag in the PlayList management information is set to "ON" (Step S1707). If the auto-playback flag in the PlayList management information is set to "OFF", Step S1706 is performed. On the other hand, if the auto-playback flag in the PlayList management information is set to "ON", the title manager 401 requests the media playback module 404 to start AV playback. Upon receipt of the request, the media playback module 404 executes playback of the specified PlayList (Step S1708). Then, the application control module 406 performs a delayed application activation process (Step S1709).

Figure 18:
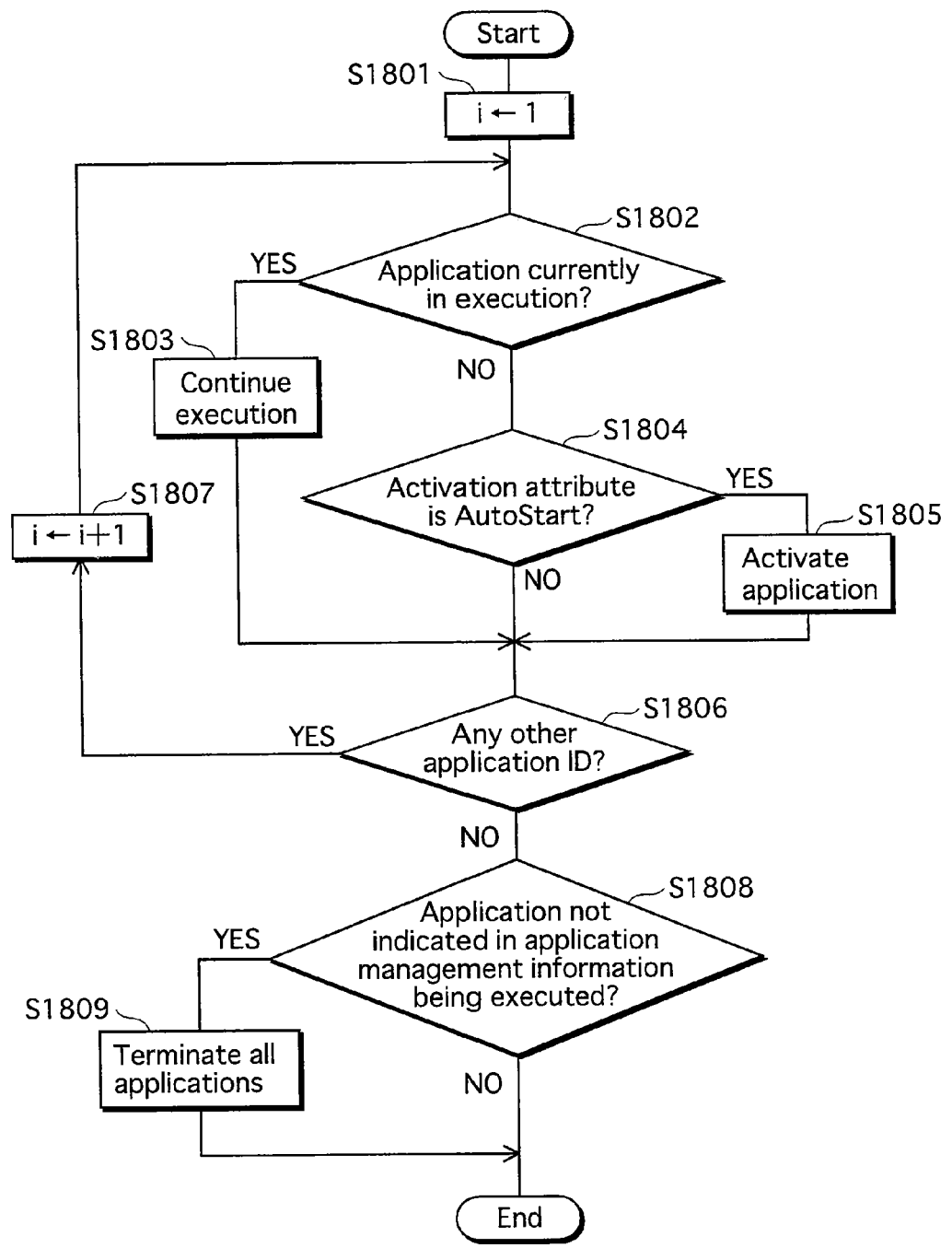
FIG. 18 is a flowchart of an application activation control process.

Next, FIG. 18 is an exemplary flowchart of the application activation control process illustrated in FIG. 17. In the flowchart, the letter "i" represents a variable specifying one of application IDs indicated in the application management information. First of all, the variable "i" is initialized (Step S1801). It is judged whether the application identified by the application ID specified by the variable "i" is currently being executed (Step S1802). If the application is currently being executed, execution of the application is continued (Step S1803). On the other hand, if the application is not currently in execution, it is then judged whether the activation attribute corresponding to the application ID is "AutoStart" (Step S1804). If the activation attribute is "AutoStart", the application is activated (Step S1805). After the above processing steps, it is judged whether the application management information indicates any other application IDs (Step S1806). If any other application ID is indicated, the variable "i" is incremented by one (Step S1807) and Step S1802 is performed. On the other hand, if no other application ID is indicated, it is judged whether any application having an application ID not indicted in the application management information is currently being executed (Step S1808). If such applications are being executed, the applications are all terminated (Step S1809). If no such an application is being executed, the process ends.

FIG. 19 illustrates an example of attribute information of a title, which is a unit of playback execution. The title attribute information is necessary for the mode management module 316 to select a title and includes a title object type 1901, a title access type 1902, a title playback type 1903, and a title object name 1904.

The title object type 1901 is attribute information used by the mode management module 316 to judge, in response to a user operation of requesting a title selection, whether the requested title is an "HDMV" title relating to the DVD-like module 313 or a "BD-J" title relating to the Java module 314. With provision of this attribute information, the playback device is enabled to execute playback of contents carried on a broadcast wave or recorded on a storage, such as a HDD, in addition to contents stored on the disc.

The title access type 1902 is attribute information used to judge whether the title is selectable by a user operation. With provision of this attribute information, the contents provider are offered an option of containing hidden titles.

The title playback type 1903 is attribute information used to judge whether a principle feature of the title is in the video and audio (Movie title) or in the associated application (Interactive title). With provision of this attribute information, the mode management module 316 is enabled to judge whether a key event generated by a user operation is to be distributed to the DVD-like module 313 or to the Java module 314.

The title object name 1904 is attribute information indicating a title object to which the title attribute information is linked.

FIG. 20 illustrates an example of title attribute information of Title #1 and Title #2 that are included in the title list. As illustrated in the figure, Title #1 is a "BD-J" title, which is to be executed by the Java module 314. In addition, Title #1 is "accessible", which means that the title is selectable by a user operation, and is a "Movie" title, which means that the main feature of the title lies in its audio and video data. In addition, the title object name is "BD-J Obj#1". On the other hand, Title #2 is a "HDMV" title, which is to be executed by the DVD-like module 313. In addition, Title #2 is "not accessible", which means that the title cannot be selected by a user operation and is an "Interactive" title, which means that the main feature of the title is in the associated application. In addition, the title object name is "Movie Obj#2".

Figure 21:
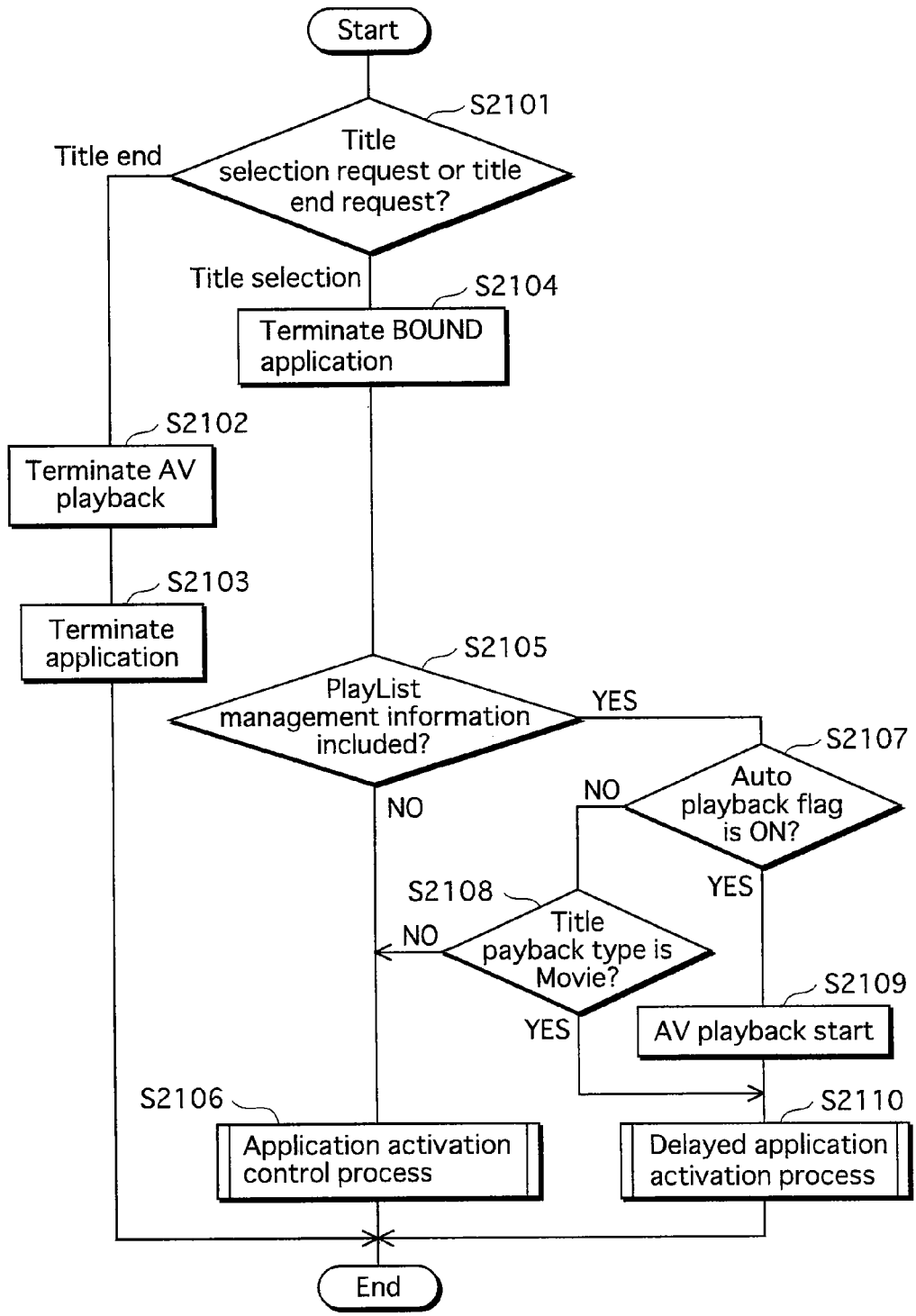
FIG. 21 illustrates a flowchart of processing steps performed in response to a title search for execution control of applications according to PlayList management information.

FIG. 21 illustrates an exemplary flowchart of processing steps performed by the title manager 401 and the application control module 406 upon receipt of a title selection request or a title end request from the mode management module 316. This example relates to the case where the requested title is provided with title attribute information. Upon receipt of a title selection request or a title end request from the mode management module 316, the title manager 401 judges which of the requests is received (Step S2101). If the received request is a title end request, the title manager 401 requests the media playback module 404 to terminate AV playback. Upon receipt of the request, the media playback module 404 terminates AV playback (Step S2102). Then, the title manager 401 requests the application control module 406 to terminate applications. Upon receipt of the request, the application control module 406 terminates all the applications currently being executed (Step S2103). On the other hand, if the received request is a title selection request, the title manager 401 requests the application control module 406 to terminate BIND applications. Upon receipt of the request, the application control module 406 terminates all the "bound" applications currently being executed (Step S2104). The title manager 401 then judges whether the selected title is provided with PlayList management information (Step S2105). If the selected title is not provided with PlayList management information, an application activation control process is performed (Step S2106). On the other hand, if the selected title is provided with PlayList management information, it is judged whether the auto-playback flag indicated in the PlayList management information is set to ON (Step S2107). If the auto-playback flag indicated in the PlayList management information is set to OFF, it is judged whether the title playback type indicated in the title attribute information is "Movie" (Step S2108). If the title playback type is not "Movie", Step S2106 is performed. On the other hand, if the title playback type is "Movie", a delayed application activation process is performed (Step S2110). If the auto-playback flag indicated in the PlayList management information is set to ON, the title manager 401 requests the media playback module 404 to start AV playback. Upon receipt of the request, the media playback module 404 executes playback of the specified PlayList (Step S4309). Then, Step S2110 is performed.

As described above, with the first embodiment, if a plurality of inputs are received as a result of chattering at the time of title selection by the user, the application program is executed in response to the most recently received input. Thus, it is avoided that the same application program is repeatedly activated, so that image display disturbance or freezing of the system operation is avoided.

It should be noted that the first embodiment relates to the case where one title corresponds to one playback section. Yet, the playback sections are not limited to titles. For example, chapters or PlayLists may be treated as titles.

Second Embodiment

A second embodiment of the present invention relates to an improvement on execution control of applications during trickplay.

Figure 22:
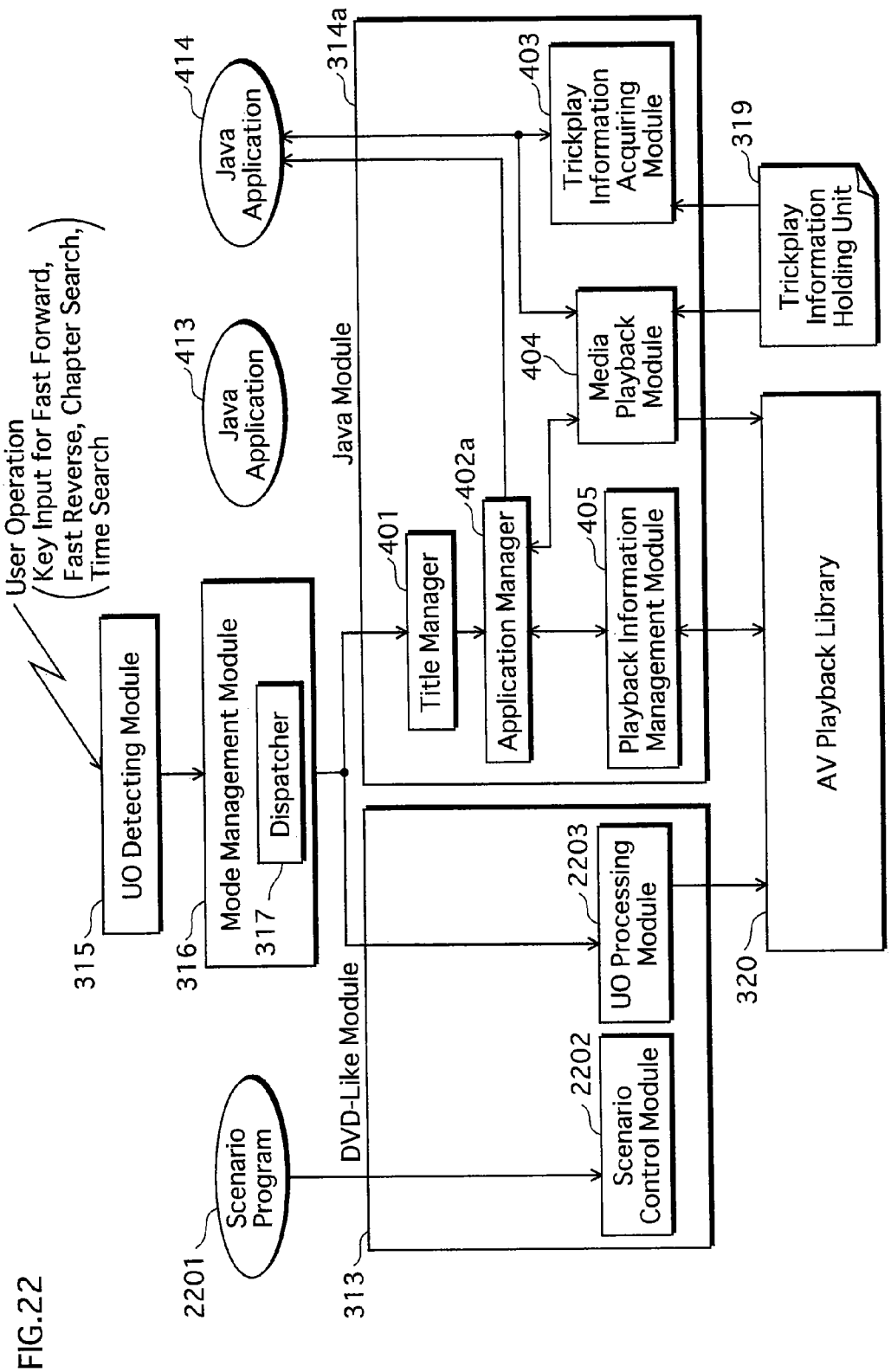
FIG. 22 is a block diagram of a structure of a playback device according to a second embodiment of the present invention, related to processes performed in response to a user operations of requesting trickplay.

FIG. 22 is a block diagram illustrating a structure of the DVD-like module 313 and a Java module 314a according to the second embodiment. In addition, the structure illustrated in the figure relates to processes performed in response to a user operations of requesting trickplay, such as fast forward playback, fast reverse playback, chapter search, and time search. First, a description is given of playback control and trickplay control executed by the DVD-like module 313.

A scenario program 2201 is a BD playback program recorded on the BD-ROM and for use in the DVD-like mode. The scenario program 2201 calls scenario control functions provided by a scenario control module 2202 and causes a conditional branch as defined in PlayList.

The scenario control module 2202 provides scenario control functions.

A UO processing module 2203 performs processes in response to a user operation made on the remote controller. More specifically, the UO processing module 2203 executes trickplay, such as fast forward playback, fast reverse playback, chapter search, and time search in accordance with a UO event received from the dispatcher 317.

Next, in the case of the Java mode, the Java application 414 recorded on the BD-ROM executes, during playback of a corresponding BD title, scenario control and trickplay control using an API provided by the media playback module 404.

The title manager 401 receives a UO event from the dispatcher 317 when the user operates the remote controller to make an input relating, for example, to fast forward playback, fast reverse playback, chapter search, or time search. The title manger 401 then passes via the application manager 402a the received UO event to the Java application 414 that is currently being executed.

When the Java application 414 executes trickplay, the playback rate changes. In response to the change in playback rate, the application manager 402a receives a trickplay start event from the media playback module 404. Once the trick start event is received, the application manager 402a operates as follows until a trickplay end event is received. That is, if a scenario transition event is received from the playback information management module 405, the application manager 402a controls behavior of the Java applications 413 and 414 according to the corresponding pieces of application management information.

The trickplay information acquiring module 403 acquires trickplay information and passes the acquired trickplay information to the Java application 414.

The media playback module 404 provides an API for media playback control to the Java application 414. When the Java application 414 calls the media playback control API, the media playback module 404 in turn calls a function from the AV playback library 320 and controls AV playback.

The playback information management module 405 manages playback information and transmits a scenario transition event to the application manager 402a.

In response to a UO event, such as a push of a fast forward button, the Java application 414 acquires trickplay information via the trickplay information acquiring module 403 and judges which of the supported playback rates should be used for trickplay. The Java application 414 reads from the trickplay information the playback rates supported by the playback device in the DVD-like mode. With reference to the read playback rates, the Java application 414 determines an appropriate playback rate for the media playback module 404.

FIG. 23 illustrates a list of system parameters (SPRMs) indicating playback information. The parameters SPRM(0) to SPRM(12) indicate the current playback state and successively change in accordance with scenario transitions. The other parameters are set as preferences of the playback device.

SPRM(0): Interactive Graphics Stream Number
SPRM(1) Audio Stream Number
SPRM(2): Presentation Graphics/Subtitle Stream Number
SPRM(3): Angle Number
SPRM(4): Current Title Number
SPRM(5): Current Chapter Number
SPRM(6): Current PlayList ID
SPRM(7): Current PlayItem ID SPRM(8): Presentation Time Information
SPRM(9): Navigation Timer
SPRM(10): Selected Key Information
SPRM(11): Menu Page ID in Interactive Graphics Stream
SPRM(12): User Style ID in Subtitle Stream
SPRM(13): Parental Level
SPRM(14): Reserved
SPRM(15): Player Configuration Value for Audio
SPRM(16): Language Code for Audio Stream
SPRM(17): Presentation Graphics/Language Code for Subtitle Stream
SPRM(18): Language Code for Menu
SPRM(19): Reserved
SPRM(20): Reserved
SPRM(21): Reserved
SPRM(22): Reserved
SPRM(23): Reserved
SPRM(24): Reserved
SPRM(25): Reserved
SPRM(26): Reserved
SPRM(27): Reserved
SPRM(28): Reserved
SPRM(29): Reserved
SPRM(30): Text Subtitles Support Information
SPRM(31): Player Version Information
SPRM(32): Reserved FIG. 24 illustrates the contents of trickplay information corresponding to playback information held by the playback device. The trickplay information includes a list of the playback rates supported by the playback device, playback rate information used in the DVD-like mode, and information triggering trickplay. For example, trickplay is triggered by button operations by the user. In the case of button operations, the trickplay information indicates, for each type of trickplay, a button ID and the number of times the button is to be pushed.

Note that although FIG. 24 illustrates an example in which fast forward playback, fast reverse playback, slow forward playback, and slow reverse playback are available, other types of trickplay may be additionally applicable. For example, trickplay may be skip playback of making a skip at a playback point corresponding to a few seconds later. In the case of skip playback, the trickplay information indicates the numbers of seconds instead of the supported playback rates. Yet, it is not necessary to indicate all the numbers of seconds supported by the playback device. It is sufficient that the trickplay information indicates the numbers of seconds available for skip playback in the DVD-like mode. This embodiment relates to a type of trickplay executed at a different playback rate than the normal playback rate. Yet, this embodiment is applicable to a type of trickplay executed with time parameter (for example, skip playback that makes a skip at a playback point corresponding to 15 seconds later).

Figure 25:
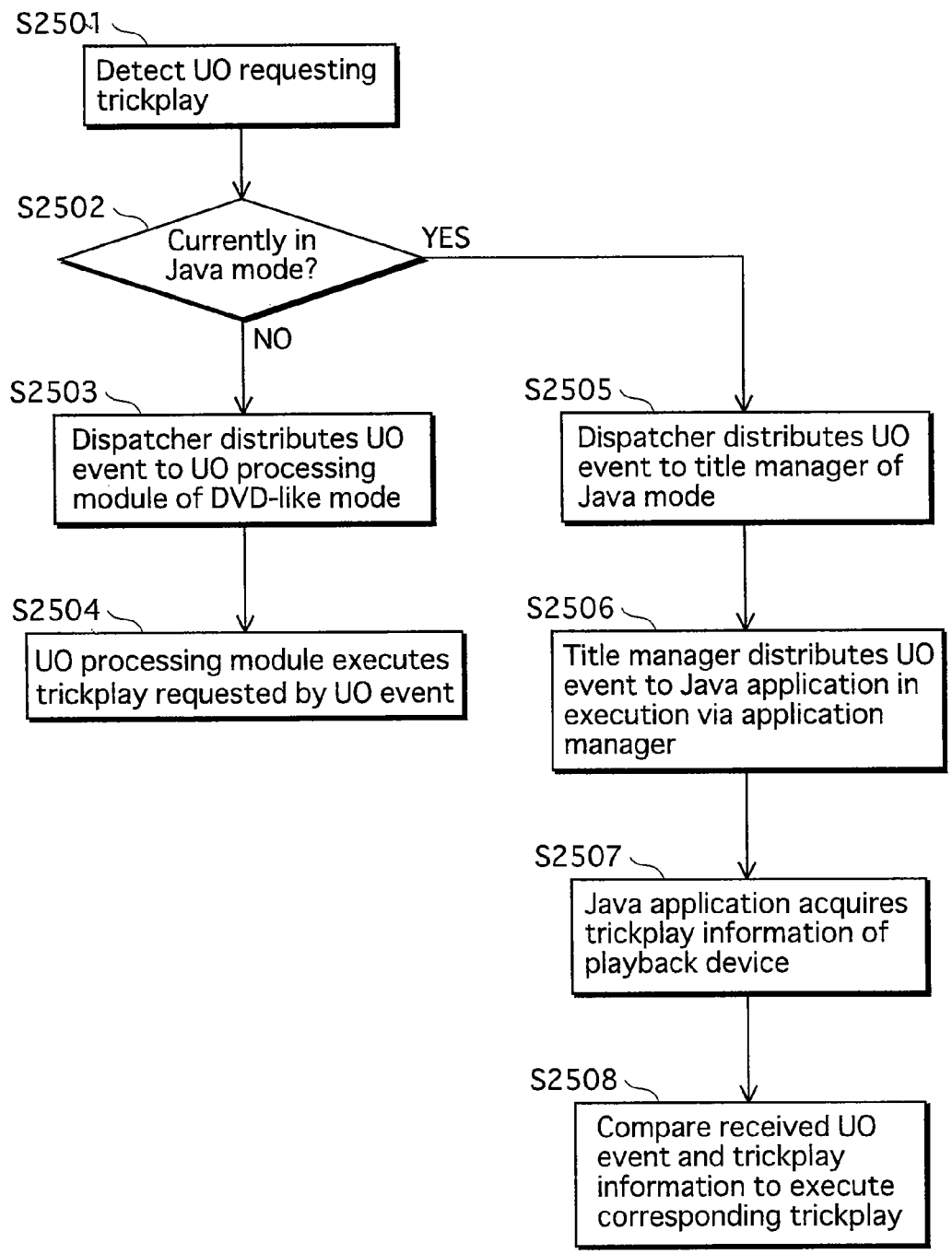
FIG. 25 illustrates a flowchart of processing steps according to the second embodiment for executing trickplay triggered by a user operation.

FIG. 25 illustrates a flowchart of processing steps for executing trickplay triggered by a user operation. When the user operates the remote controller or the front panel of the playback device to push, for example, a fast-forward button, the UO detecting module 315 detects the key operation made by the user (Step S2501) and throws an event corresponding to the detected key operation to the mode management module 316. In response, the mode management module 316 judges whether the current mode is the Java mode or the DVD-like mode (Step S2502). If the current mode is the DVD-like mode, the dispatcher 317 included in the mode management module 316 throws the UO event to the UO processing module 2203 included in the DVD-like module (Step S2503). The UO processing module 2203 executes playback control corresponding to the received UO event (Step S2504). On the other hand, if the current mode is the Java mode, the dispatcher 317 throws the UO event to the title manager 401 in the Java module (Step S2505). Upon receipt of the UO event, the title manager 401 in turn throws the received UO event to the Java application 414 currently being executed, via the application manager 402a (Step S2506). Upon receipt of the UO event, the Java application 414 acquires trickplay information of the playback device via the trickplay information acquiring module 403 (Step S2507). The Java application 414 then executes, via the media playback module 404, trickplay control corresponding to the received UO event in accordance with the trickplay information (Step S2508). For example, in the case where the received UO event is a push of the fast forward button, the Java application 414 keeps the count of how many times the button is pushes in succession. Depending on whether the fast-forward button is pushed once, twice or three times, the Java application 414 selects an appropriate playback rate from the trickplay information.

In the above description, the Java application 414 acquires trickplay information after the UO event is received. Alternatively, however, the Java application 414 may read trickplay information in advance, for example at the time of device start-up. In addition, the trickplay information read in advance may be held within the Java application 414.

Figure 26:
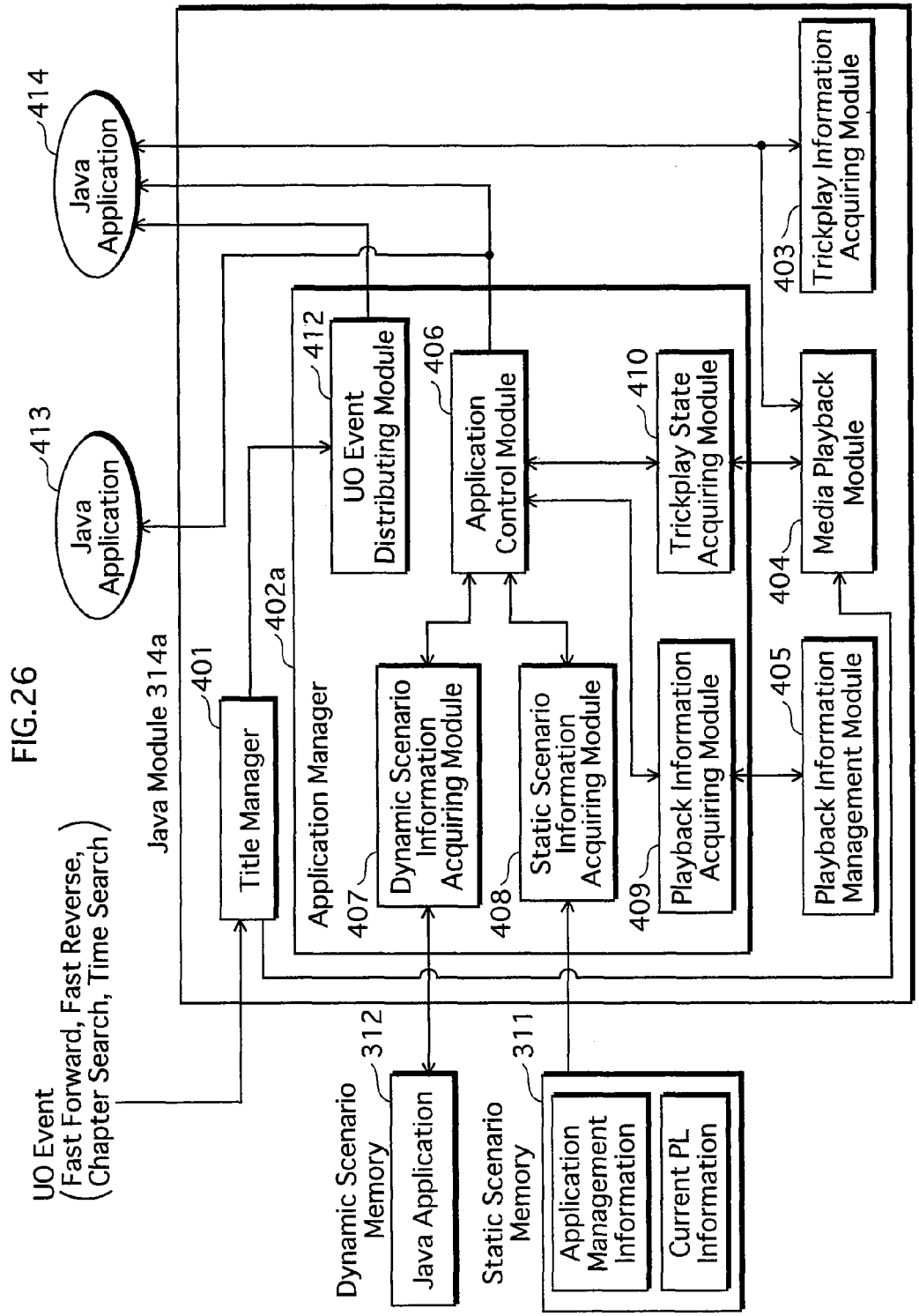
FIG. 26 is a block diagram illustrating a structure of the playback device according to the second embodiment, related to processes performed in response to a user operation of requesting trickplay.

FIG. 26 is a block diagram illustrating the structure of the application manager 402a illustrated in FIG. 22, in further detail. In addition, the structure illustrated in the figure relates to processes performed in response to a user operation of requesting trickplay, such as fast forward playback, fast reverse playback, chapter search, and time search.

When the Java application 414 executes trickplay, the application control module 406 controls behavior of the Java applications 413 and 414 acquired from the dynamic scenario acquiring module 407. The control is executed based on the application management information acquired from the static scenario acquiring module 408, the trickplay state (trickplay start, trickplay execution, and trickplay end) acquired from the trickplay state acquiring module 410, and the playback information acquired from the playback information acquiring module 409.

Figure 27:
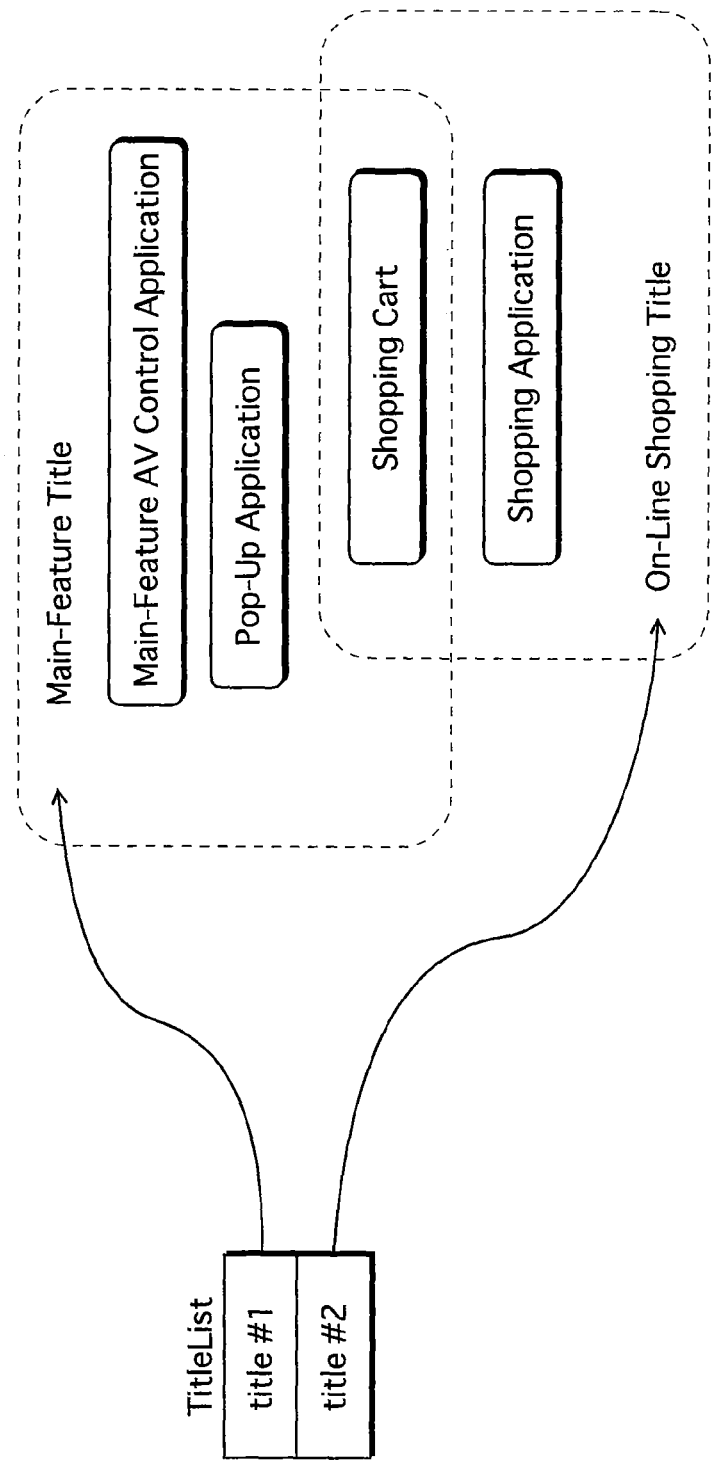
FIG. 27 illustrates a management unit of applications according to the second embodiment.

Next, FIG. 27 illustrates that each title listed in the title list is a management unit of applications.

Title #1 contains a main feature movie. When Title #1 is selected, an application for executing playback of the main feature video is activated, so that playback of the main feature video starts. Upon receipt of an event such as a key operation made on the remote controller for requesting fast forward playback or skip playback, the activated application instructs the media playback module to control behavior of the playback device accordingly. When playback of Title #1 starts, other applications are activated as necessary, in addition to the application for main feature playback. For example, an application for presenting a pop-up menu and an application for presenting a shopping cart are activated to allow the user to purchase goods appearing in the main feature video. In order to switch to another title from the main feature title, a title transition is executed. For example, in order to activate the on-line shopping application to purchase goods appearing in the main feature playback, the user selects Title #2 associated with the on-line shopping application. When Title #2 is selected, similarly to Title #1, applications associated with Title #2 are activated and applications not associated with Title #2 are terminated. Applications associated with both Title #1 and Title #2 are continuously executed beyond the title transition. In other words, if an application is associated with both Title #1 and Title #2, the application remains in execution without termination and restart during a transition process from Title #1 to Title #2.

FIG. 28 illustrates an example of application management information according to the second embodiment.

Each piece of application management information induces an effective period 2801, the application ID 501, and the activation attribute 502. The application management information manages, in correspondence with each application ID 501, the effective period 2801 during which the application is to be executed in sync with video playback. In addition, the activation attribute 502 indicates whether the application is to be activated automatically in the specified effective period 2801.

The effective period 2801 indicates either of "title", "chapter", "PlayList", and "PlayList: PlayItem". The effective period "title" indicates that the corresponding application is effective throughout the entire title. The effective period "chapter" indicates that the corresponding application is effective throughout a period between adjacent PlayList Marks indicated in the PlayList. The effective period "PlayList" indicates that the corresponding application is effective throughout the entire PlayList. The effective period "PlayList: PlayItem" indicates that the corresponding application is effective throughout the PlayItem in the PlayList. The application ID 501 and the activation attribute 502 are identical to those described in the first embodiment.

As illustrated in FIG. 28, in addition, if the same application is associated with a plurality of titles, the application is allowed to be continuously executed throughout the plurality of titles. The application management information indicates that Application #3 is associated with both Title #1 and Title #2. Thus, Application #3 is activated during playback of Title #1. Since Application #3 is also associated with Title #2, Application #3 is executed also during playback of Title #2. That is to say, Application #3 is continuously executed beyond a transition from Title #1 to Title #2 without being terminated when playback of Title #1 ends. As described above, if the same application is associated with a plurality of titles, the application is continuously executed without termination and restart at the transition between the associated titles. Yet, even if an application is associated with a plurality of titles, the application is terminated when a title not associated with the application starts.

Figure 29:
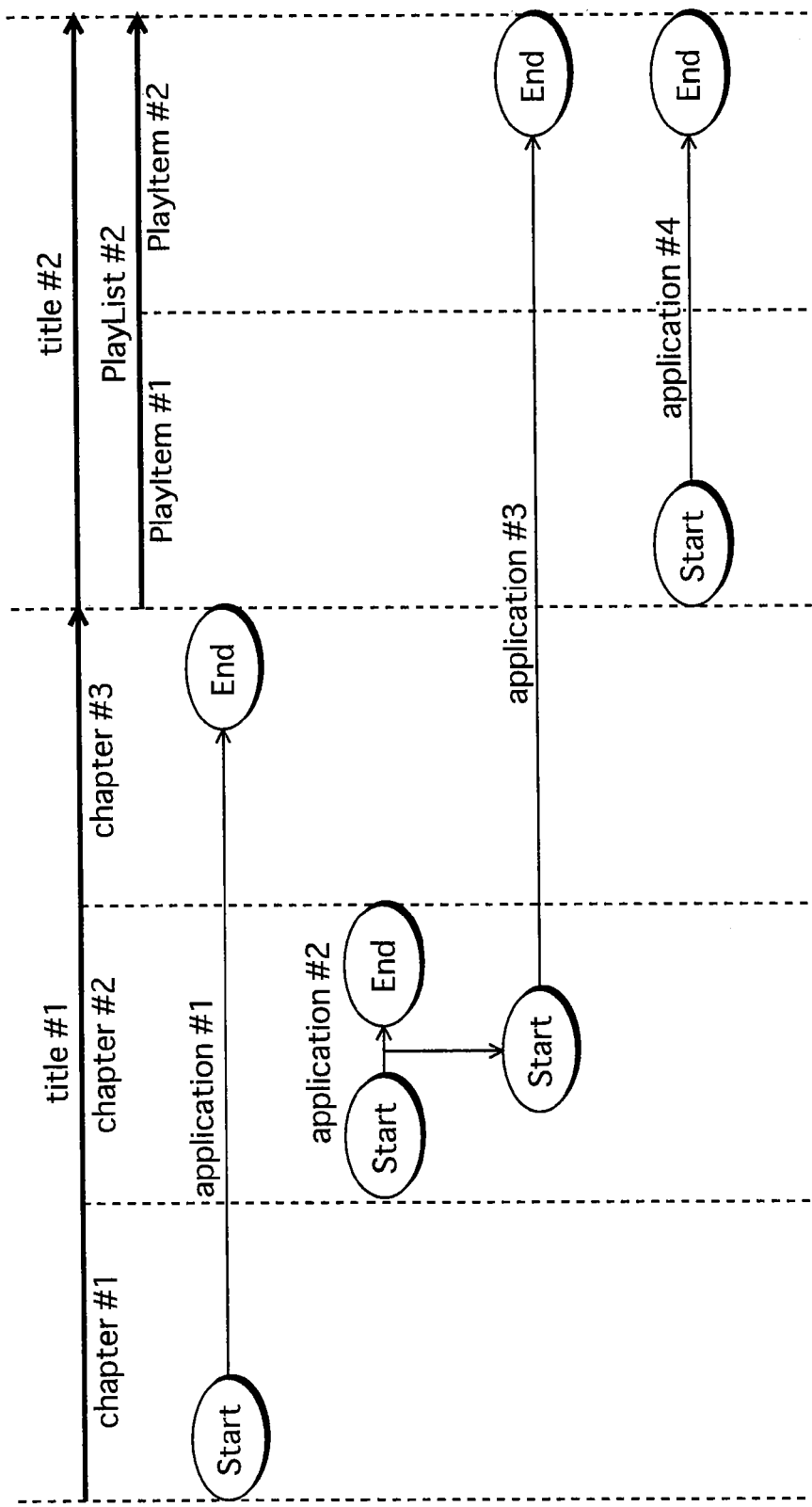
FIG. 29 illustrates applications executed in accordance with a title transition based on the application management information illustrated in FIG. 28.

FIG. 29 illustrates applications executed based on the application management information illustrated in FIG. 28, in the case where normal playback of Title #1 and Title #2 are sequentially executed. In this example, it is supposed that each application having the "Present" attribute is activated by another application. Upon playback start of Title #1, Application #1 having the "AutoStart" attribute is activated according to a corresponding piece of application management information. When playback proceeds from Chapter #1 to Chapter #2, Application #2 associated with Chapter #2 and having the "AutoStart" attribute is activated. After Application #3 is activated by Application #2, playback of Chapter #3 starts. Then, Application #2 not associated with Chapter #3 is terminated. When playback of Chapter #3 ends, playback of Title #1 ends and playback of Title #2 starts. At the playback start of Title #2, Application #1 not associated with Title #2 is terminated and Application #4 having the "AutoStart" attribute is activated according to the corresponding piece of application management information. When playback of Title #2 ends, Application #3 and Application #4 are both terminated.

Figure 30:
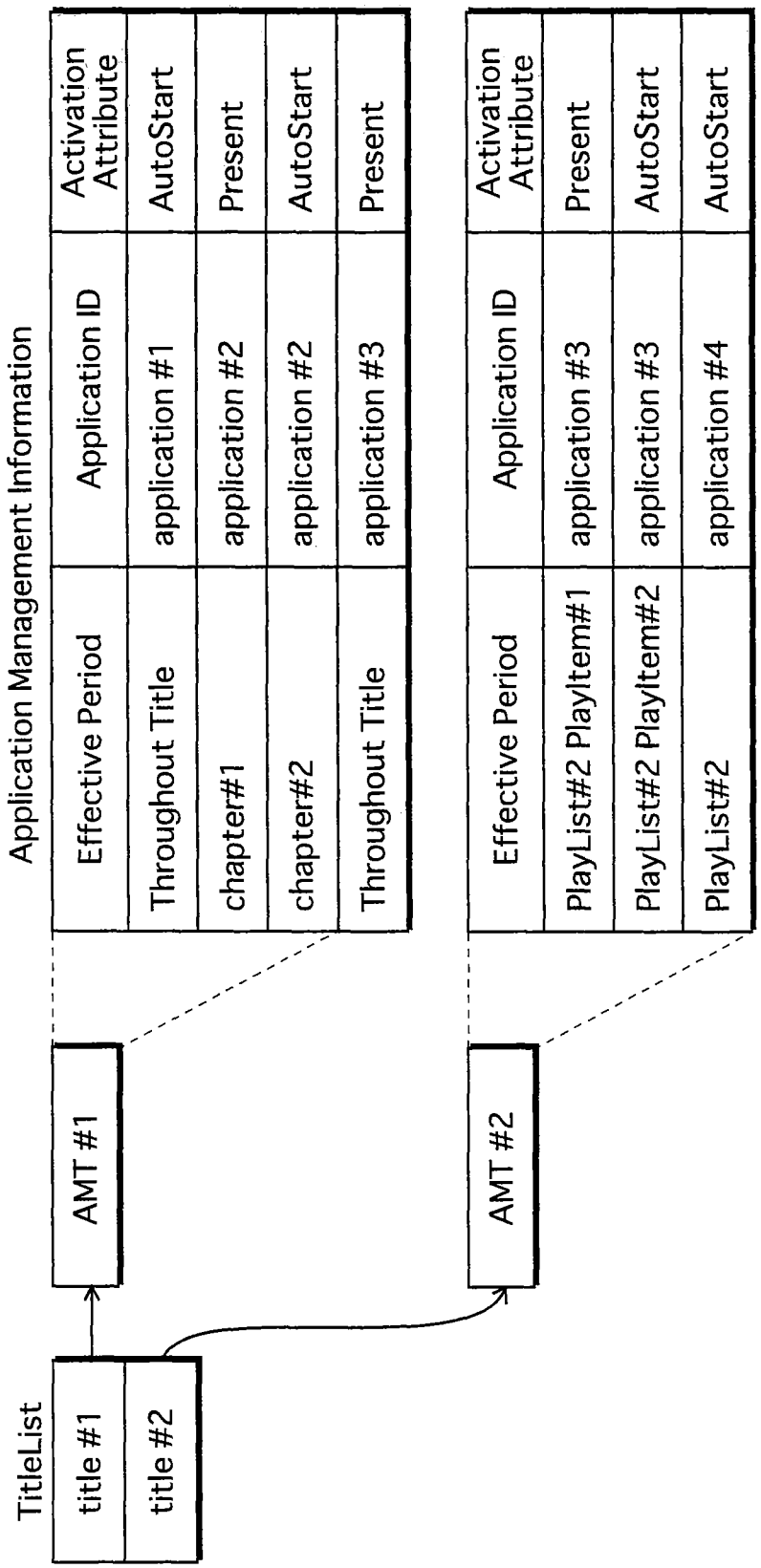
FIG. 30 illustrates a management unit of applications according to the second embodiment.

FIG. 30 illustrates an example of in which each title is provided with a different piece of application management information.

Figure 31:
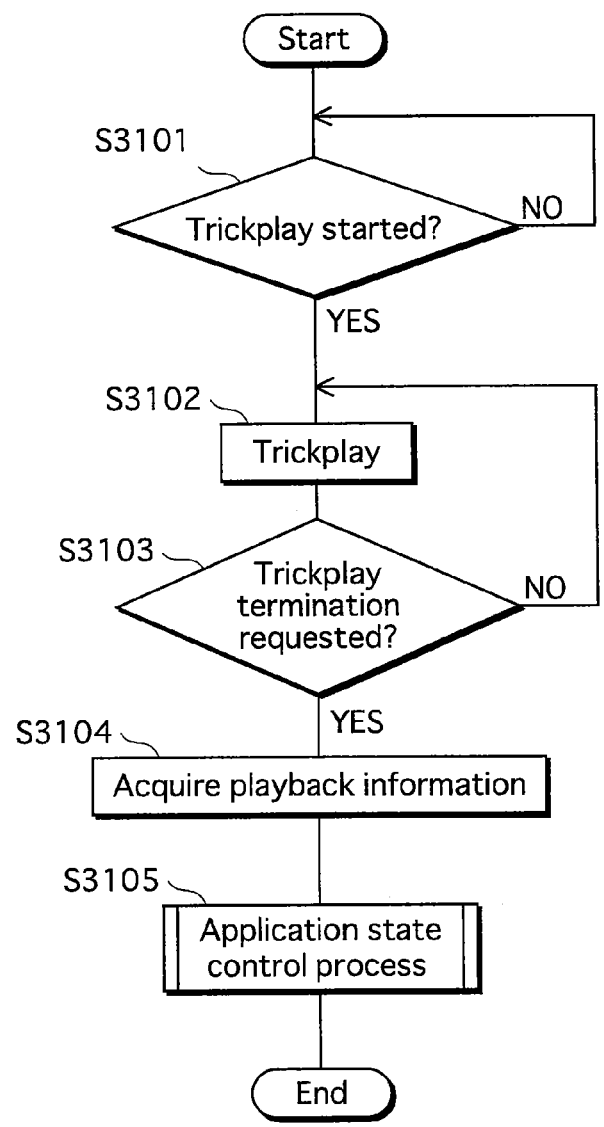
FIG. 31 illustrates a flowchart of processing steps performed for execution control of applications during trickplay, according to the second embodiment.

FIG. 31 illustrates an exemplary flowchart of processing steps performed by the application control module 406 according to the second embodiment. When executing trickplay during title playback, no application is activated or terminated during trickplay and the application activation and termination are carried out when the trickplay ends. In this example, it is supposed that application management information is acquired in advance of title playback. The application control module 406 monitors whether the trickplay state acquiring module 410 receives a trickplay start event during title playback (Step S3101). Upon receipt of a trickplay start event, trickplay starts (Step S3102), so that no application is newly activated or terminated until the trickplay state acquiring module 410 receives a trickplay end event. Next, the trickplay state acquiring module 410 monitors whether a trickplay end event is received (Step S3103). Upon receipt of a trickplay end event, the application control module 406 acquires playback information from the playback information acquiring module 409 (Step S3104). More specifically, the playback information acquired herein includes the title number SPRM(4), chapter number SPRM(5), PlayList ID SPRM(6), and PlayItem ID SPRM(7). The application control module 406 then performs an application state control process (Step S3105).

Figure 32:
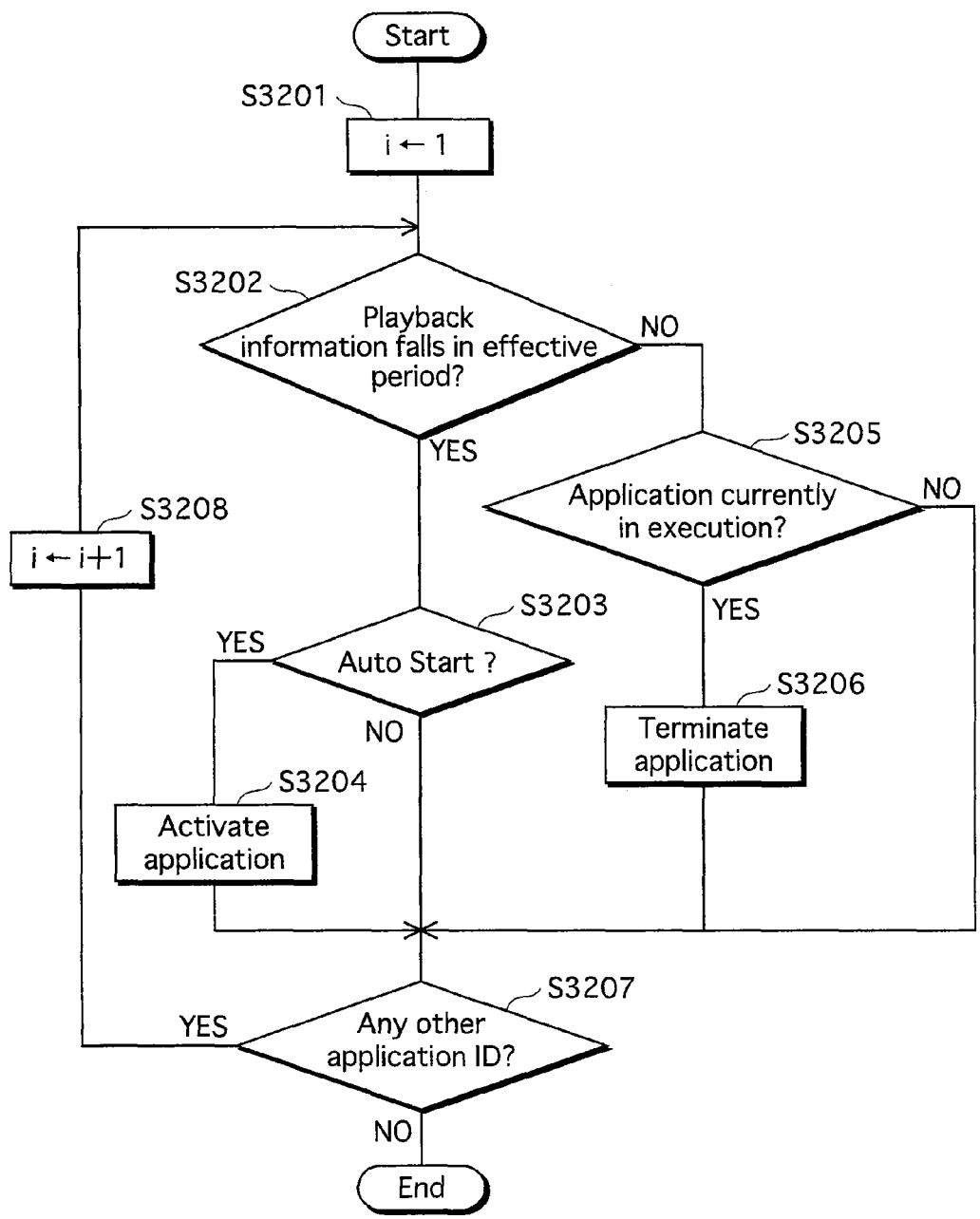
FIG. 32 illustrates a flowchart of an application state control process illustrated in FIG. 31.

Next, FIG. 32 illustrates an exemplary flowchart of the application state control process. In this example, it is supposed that application management information is acquired in advance of title playback. The application control module 406 controls execution of applications based on the application management information having been acquired from the static scenario acquiring module 408. In the flowchart, the letter "i" is a variable specifying one of application IDs indicated in the application management information. First of all, the variable "i" is initialized (Step S3201). With reference to the acquired playback information (title number SPRM(4), chapter number SPRM(5), PlayList ID SPRM(6), and PlayItem ID SPRM(7)) and the effective period corresponding to the application ID, it is judged whether the playback information falls within the effective period (Step S3202). If the playback information falls within the effective period, it is then judged whether the activation attribute corresponding to the application ID is "AutoStart" (Step S3203). If the activation attribute is "AutoStart", the application corresponding to the application ID is activated (Step S3204). On the other hand, if the playback information does not fall within the effective period, it is then judged whether the application corresponding to the application ID is currently being executed (Step S3205). If the application is currently being executed, the application is terminated (Step S3206). After the application is activated (Step S3204), or if the activation attribute is not "AutoStart" (Step S3203: NO), or after the application is terminated (Step S3206), or the application is not being executed (Step S3205: NO), it is then judged whether the application management information indicates any other application ID (Step S3207). If any other application ID is indicated, the variable "i" is incremented by one (Step S3208) and Step S3202 is performed next. If no other application ID is indicated, the process is terminated.

FIG. 33 illustrates an example of application management information which allows an application to be terminated upon expiry of the effective period even during trickplay. The application management information includes an in-trickplay end flag 3301 for allowing a corresponding application to be terminated upon expiry of the effective period. When the in-trickplay end flag 3301 is set to "Yes", the application is terminated upon expiry of the effective period even during trickplay. If the in-trickplay end flag 3301 is set to "No", the application is not terminated during trickplay.

Figure 34:
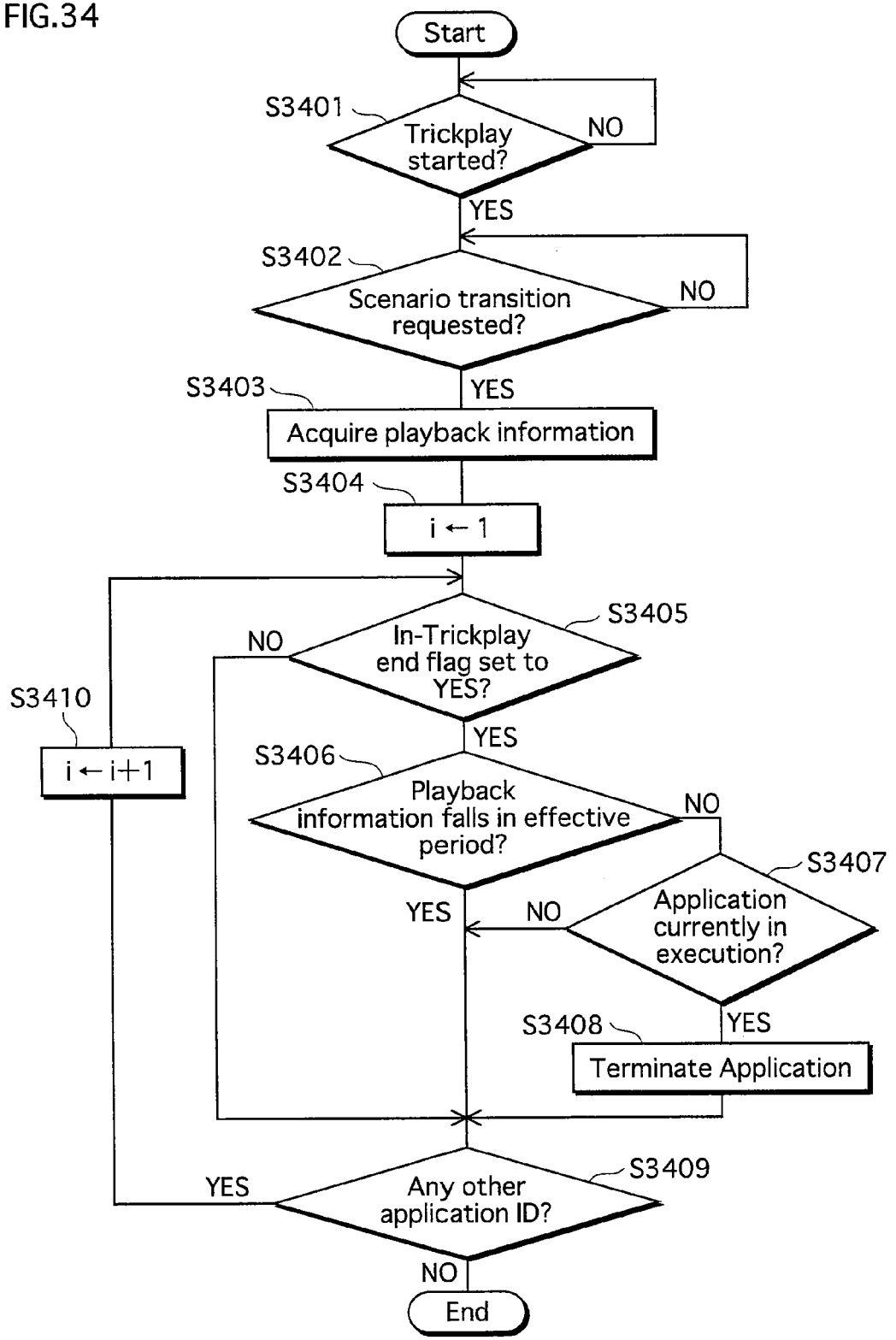
FIG. 34 illustrates a flowchart of processing steps performed according to the second embodiment for terminating applications during trickplay.

FIG. 34 illustrates an exemplary flowchart of processing steps performed when a scenario transition event is received from the playback information acquiring module 409 during trickplay. In this example, the processing steps are performed in accordance with the application management information illustrated in FIG. 33. In the flowchart, the letter "i" represents a variable specifying one of application IDs indicated in the application management information. First of all, the application control module 406 monitors whether the trickplay state acquiring module 410 receives a trickplay start event during title playback (Step S3401). Upon receipt of a trickplay start event, trickplay starts. It is then judged whether a scenario transition event is received from the playback information acquiring module 409 (Step S3402). Upon receipt of a scenario transition event from the playback information acquiring module 409, the application control module 406 acquires current playback information from the playback information acquiring module 409 (S3403). More specifically, the current playback information acquired herein includes the title number SPRM(4), chapter number SPRM(5), PlayList ID SPRM(6), and PlayItem ID SPRM(7). Next, the variable "i" is initialized (Step S3404). Then, it is judged whether the in-trickplay end flag is set to "Yes" (Step S3405). If the in-trickplay end flag is set to "Yes", it is judged whether the playback information falls within the effective period (Step S3406). The judgment is made with reference to the current playback information (title number SPRM(4), chapter number SPRM(5), PlayList ID SPRM(6), PlayItem ID SPRM(7)) and the effective period indicated in the application management information. If the playback information does not fall within the effective period, it is judged whether the application corresponding to the application ID is currently being executed (Step S3407). If the application is currently being executed, the application is terminated (Step S3408). If the in-trickplay end flag is set to "No" (Step S3405: NO), or if the application is not currently being executed (Step S3407: NO), or if the playback information falls within the effective period (Step S3406: YES), or after the application is terminated (Step S3408), it is judged whether the application management information indicates any other application ID (Step S3409). If any other application ID is indicated, the variable "i" is incremented by one (Step S3410) and Step S3405 is performed next. If no other application ID is indicated, the process is terminated.

FIG. 35 illustrates an example of application management information which allows an application to be activated upon expiry of the effective period even during trickplay. The application management information includes an in-trickplay activation flag 3501 for allowing a corresponding application to be activated upon start of the effective period. When the in-trickplay end flag 3501 is set to "Yes", the application is activated upon start of the effective period even during trickplay. If the in-trickplay activation flag 3501 is set to "No", the application is not activated during trickplay.

Figure 36:
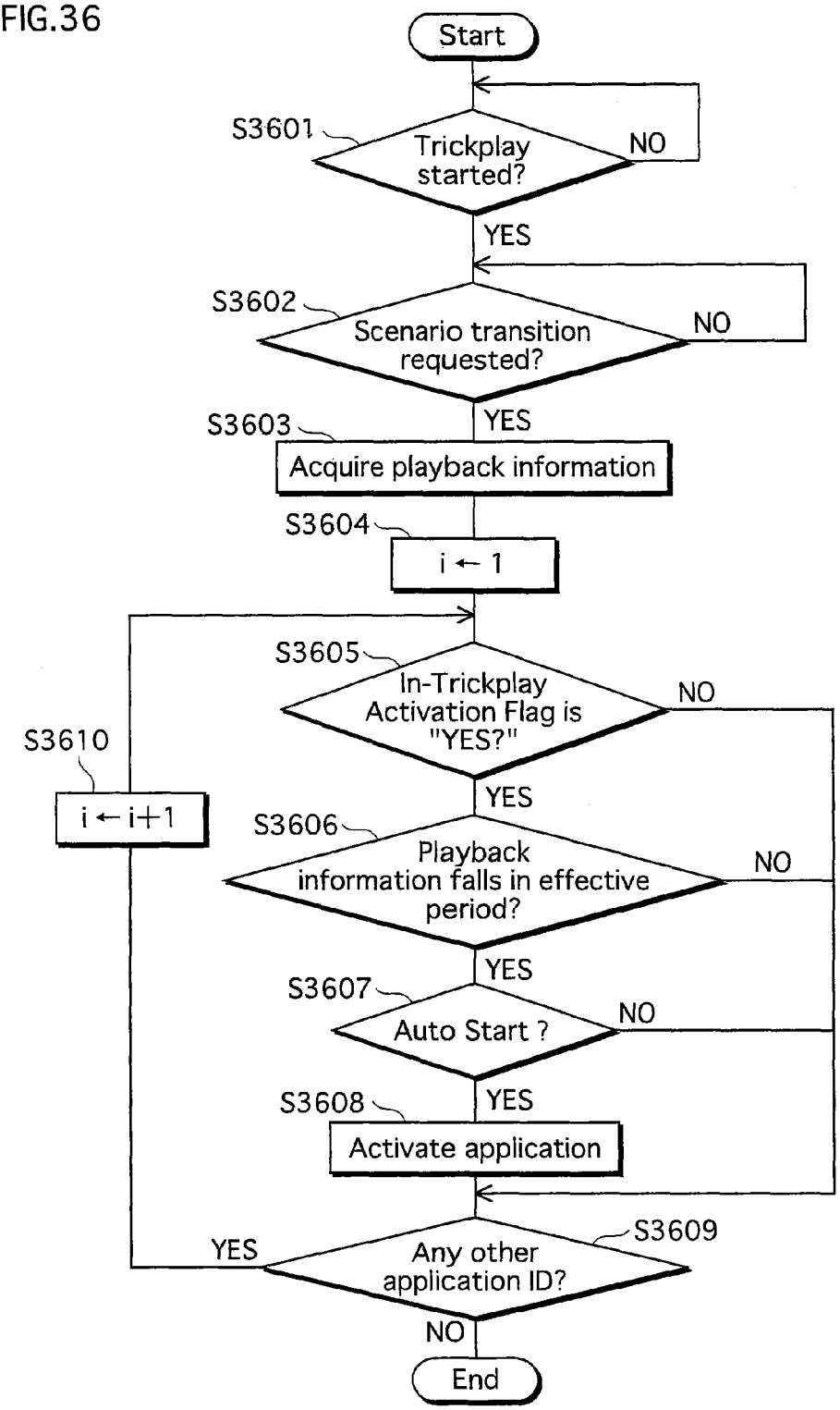
FIG. 36 illustrates a flowchart of processing steps performed according to the second embodiment for activating applications during trickplay.

FIG. 36 illustrates an exemplary flowchart of processing steps performed when a scenario transition event is received from the playback information acquiring module 409 during trickplay. In this example, the processing steps are performed in accordance with the application management information illustrated in FIG. 35. In the flowchart, the letter "i" represents a variable specifying one of application IDs indicated in the application management information. First of all, the application control module 406 monitors whether the trickplay state acquiring module 410 receives a trickplay start event during title playback (Step S3601). Upon receipt of a trickplay start event, trickplay starts. It is then judged whether a scenario transition event is received from the playback information acquiring module 409 (Step S3602). Upon receipt of a scenario transition event from the playback information acquiring module 409, the application control module 406 acquires current playback information from the playback information acquiring module 409 (Step S3603). More specifically, the current playback information acquired herein includes the title number SPRM(4), chapter number SPRM(5), PlayList ID SPRM(6), and PlayItem ID SPRM(7). Next, the variable "i" is initialized (Step S3604). Then, it is judged whether the in-trickplay activation flag is set to "Yes" (Step S3605). If the in-trickplay activation flag is set to "Yes", it is judged whether the playback information falls within the effective period (Step S3606). The judgment is made with reference to the current playback information (title number SPRM(4), chapter number SPRM(5), PlayList ID SPRM(6), and PlayItem ID SPRM(7)) and the effective period indicated in the application management information. If it is judged that the playback information falls within the effective period, it is then judged whether the activation attribute indicated in the application management information is "AutoStart" (Step S3607). If the activation attribute is "AutoStart", the application corresponding to the application ID is activated (Step S3608). If the in-trickplay activation flag is set to "No" (Step S3605: NO), or if the playback information does not fall within the effective period (Step S3606: NO), or if the activation attribute is not "AutoStart" (Step S3607: NO), or after the application is activated (Step S3608), it is judged whether the application management information indicates any other application ID (Step S3609). If any other application ID is indicated, the variable "i" is incremented by one (Step S3610) and Step S3605 is performed next. If no other application ID is indicated, the process is terminated.

Note that it is applicable to employ both the in-trickplay activation flag and the in-trickplay end flag.

Next, FIG. 37 illustrates an example of application management information which allows an application to be activated and terminated respectively upon start and expiry of the effective period during fast-speed playback. The application management information includes a fast playback flag 3701 for allowing a corresponding application to be activated and terminated upon start and expiry of the effective period even during fast-speed playback. When the fast playback flag 3701 is set to "Yes", the application is activated and terminated upon start and expiry of the effective period even during fast-speed playback. If the fast playback flag is set to "No", the application is not executed and terminated during fast-speed playback.

The judgment as to whether fast-speed playback is being executed is made based on the playback rate or a UO event.

Figure 38:
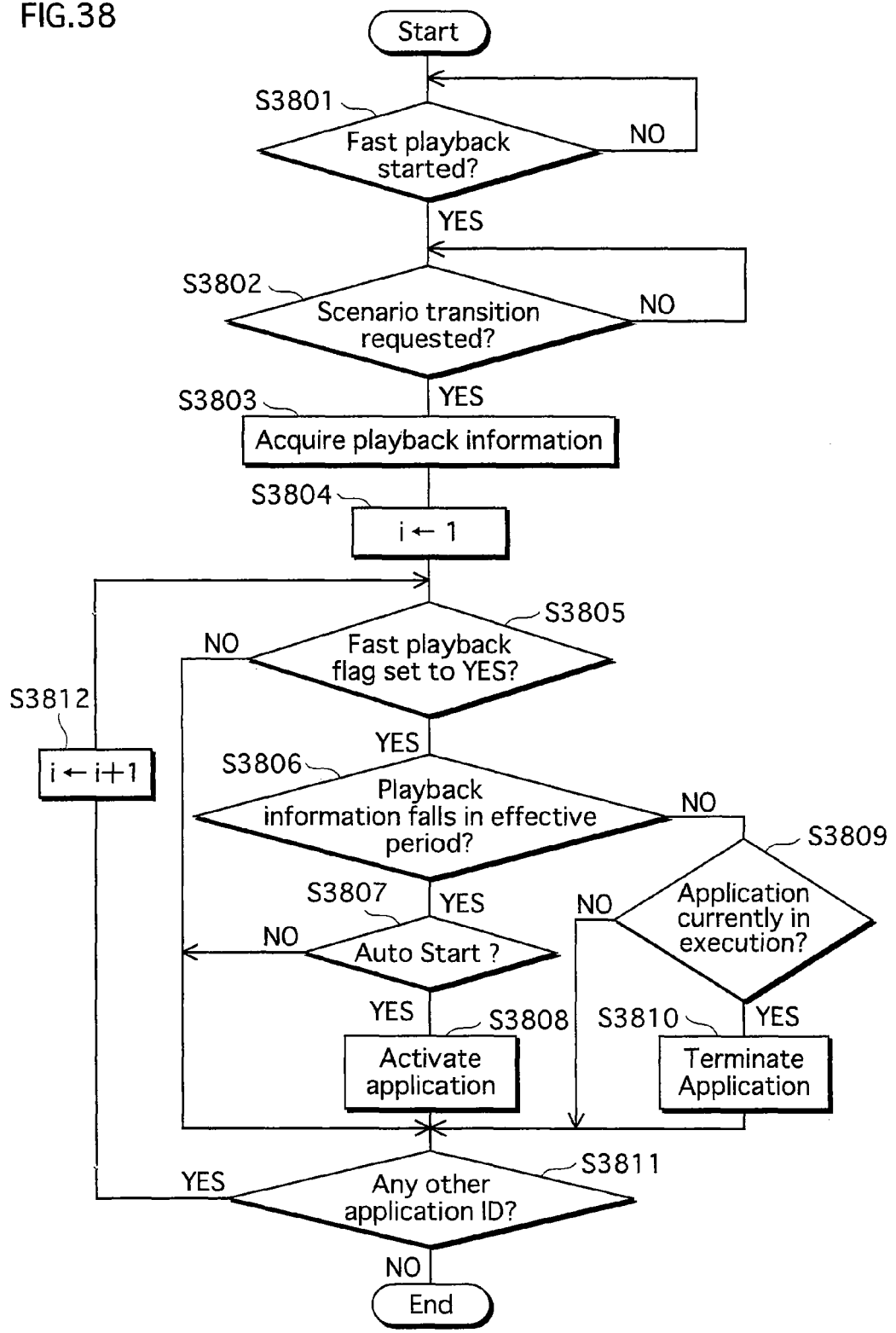
FIG. 38 illustrates a flowchart of processing steps performed according to the second embodiment for execution control of applications during fast-speed playback.

FIG. 38 illustrates an exemplary flowchart of processing steps performed by the application control module 406 that includes a mechanism for judging whether to activate or terminate the application when a scenario transition event is received from the playback information acquiring module 409. In this example, the processing steps are performed in accordance with the application management information illustrated in FIG. 37. In the flowchart, the letter "i" represents a variable specifying one of application IDs indicated in the application management information. The application control module 406 judges whether trickplay being executed is fast-speed playback (Step S3801). If fast-speed playback is being executed, the application control module 406 monitors whether the trickplay state acquiring module 410 receives a scenario transition event (Step S3802). Upon receipt of a scenario transition event, the application control module 406 acquires current playback information from the playback information acquiring module 409 (Step S3803). More specifically, the current playback information acquired herein includes the title number SPRM(4), chapter number SPRM(5), PlayList ID SPRM(6), and PlayItem ID SPRM(7). Next, the variable "i" is initialized (Step S3804). Then, it is judged whether the fast playback flag is set to "Yes" (Step S3805). If the fast playback flag is set to "Yes", it is judged whether the current playback information falls within the effective period (Step S3806). The judgment is made with reference to the current playback information (title number SPRM(4), chapter number SPRM(5), PlayList ID SPRM(6), and PlayItem ID SPRM(7)) and the effective period indicated in the application management information. If the playback information falls within the effective period, it is judged whether the activation attribute indicated in the application management information is "AutoStart" (Step S3807). If the activation attribute is "AutoStart", the application corresponding to the application ID is activated (Step S3808). If the playback information does not fall within the effective period, it is then judged whether the application corresponding to the application ID is currently being executed (Step S3809). If the application is currently being executed, the application is terminated (Step S3810). If the fast playback flag is set to "No" (Step S3805: NO), or if the activation attribute is not "AutoStart" (Step S3807: NO), or after the application is activated (Step S3808), or if the application is not currently being executed (Step S3809: NO), or after the application is terminated (Step S3810), it is judged whether the application management information indicates any other application ID (Step S3811). If any other application ID is indicated, the variable "i" is incremented by one (Step S3812) and Step S3805 is performed next. If no other application ID is indicated, the process is terminated.

FIG. 39 illustrates an example of application management information for allowing an application to be activated and terminated upon start and expiry of the effective period even during trickplay depending on the playback rate. The application management information includes a trickplay rate 3901 for allowing a corresponding application to be activated and terminated upon start and expiry of the effective period. In the case where the trickplay rate 3901 is specified, a corresponding application is allowed to be activated and terminated upon start and expiry of the effective period even during trickplay, on condition that the playback rate falls within the range of specified trickplay rate 3901. If the trickplay rate 3901 is not specified as indicated with the mark "-" in the figure, the application is not activated or terminated during trickplay.

Figure 40:
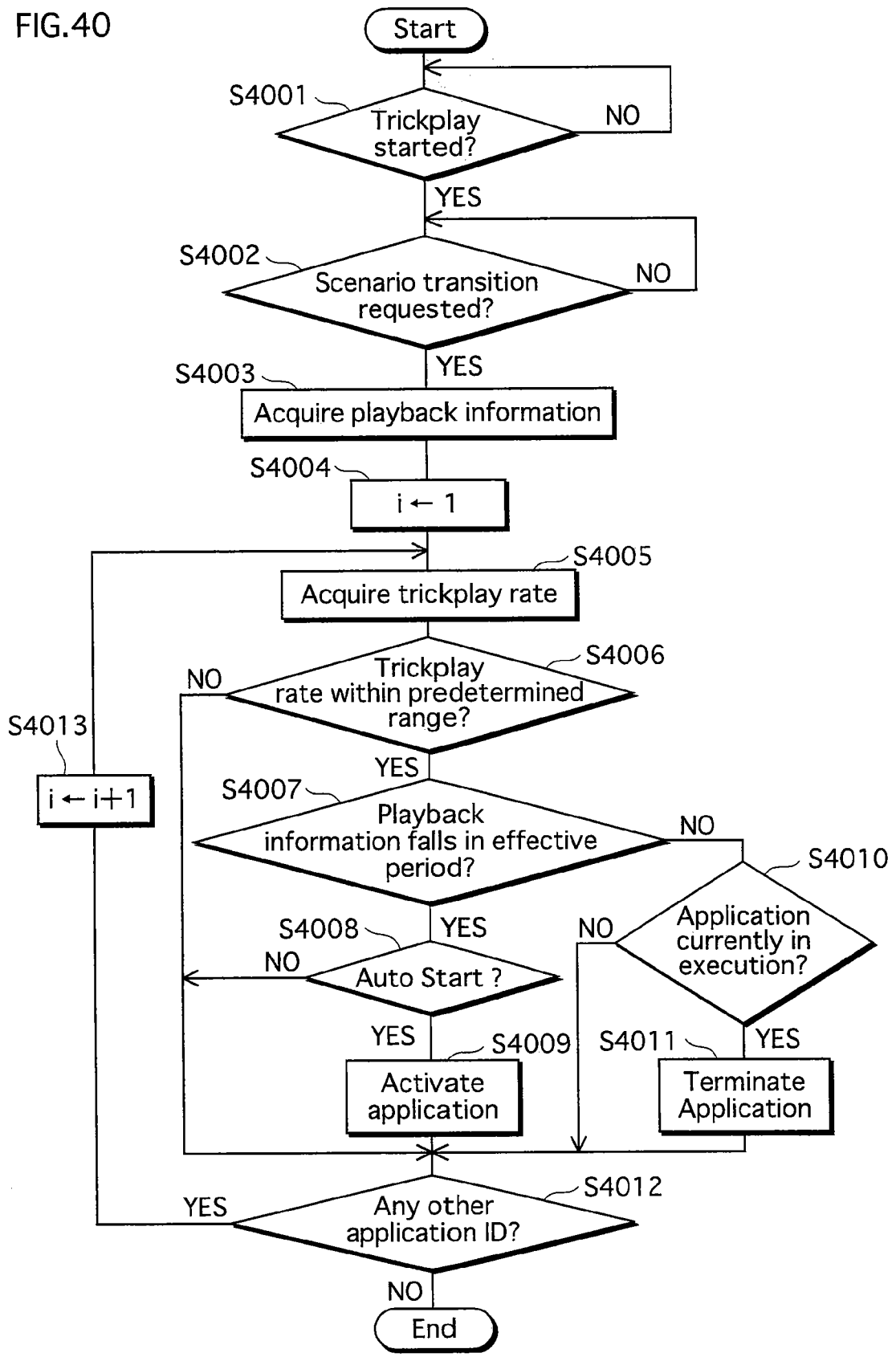
FIG. 40 illustrates a flowchart of processing steps performed according to the second embodiment for execution control of applications depending on the current playback rate.

FIG. 40 illustrates an exemplary flowchart of processing steps performed by the application control module 406 that includes a mechanism for judging whether to activate or terminate the application when a scenario transition event is received from the playback information acquiring module 409 during trickplay. In this example, the processing steps are performed in accordance with the application management information illustrated in FIG. 39. In the flowchart, the letter "i" represents a variable specifying one of application IDs indicated in the application management information. First of all, the application control module 406 monitors whether the trickplay state acquiring module 410 receives a trickplay start event during title playback (Step S4001). Upon receipt of a trickplay start event, trickplay starts. It is then monitored whether a scenario transition event is received from the playback information acquiring module 409 (Step S4002). Upon receipt of a scenario transition event from the playback information acquiring module 409, the application control module 406 acquires current playback information from the playback information acquiring module 409 (Step S4003). More specifically, the current playback information acquired herein includes the title number SPRM(4), chapter number SPRM(5), PlayList ID SPRM(6), and PlayItem ID SPRM(7). Next, the variable "i" is initialized (Step S4004). Then, the application control module 409 acquires the current playback rate from the trickplay state acquiring module 410 (Step S4005) and judges whether the current playback rate falls within the range of specified trickplay rate (Step S4006). If the current playback rate falls within the specified range, it is judged whether the playback information falls within the effective period (Step S4007). The judgment is made with reference to the current playback information (title number SPRM(4), chapter number SPRM(5), PlayList ID SPRM(6), and PlayItem ID SPRM(7)) and the effective period indicated in the application management information. If the playback information falls within the effective period, it is then judged whether the activation attribute indicated in the application management information is "AutoStart" (Step S4008). If the activation attribute is "AutoStart", the application corresponding to the application ID is activated (Step S4009). If it is judged that the playback information does not fall within the effective period, it is then judged whether the application corresponding to the application ID is currently being executed (Step S4010). If the application is currently being executed, the application is terminated (Step S4011). If the current playback rate does not fall within the specified range or no trickplay rate is specified as indicated with the mark "-" (Step S4006: NO), or if the activation attribute is not "AutoStart" (Step S4008: NO), or after the application is activated (Step S4009), or if the application is not currently being executed (Step S4010: NO), or after the application is terminated (Step S4011), it is judged whether the application management information indicates any other application ID (Step S4012). If any other application ID is indicated, the variable "i" is incremented by one (Step S4013) and Step S4005 is performed next. If no other application ID is indicated, the process is terminated.

Figure 41:
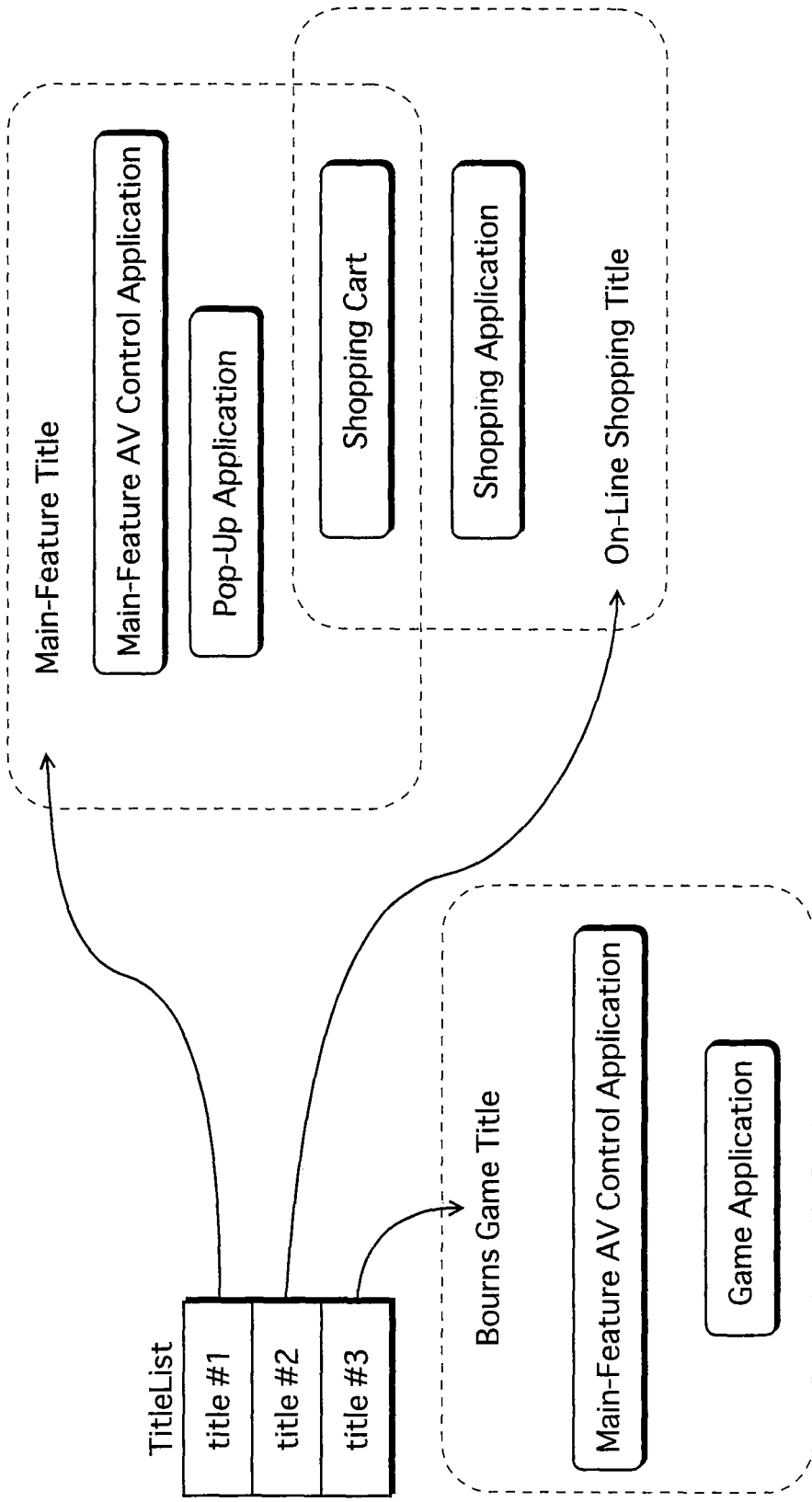
FIG. 41 illustrates a management unit of applications according to the second embodiment.

Next, FIG. 41 illustrates an example in which Title #3 is provided as a bonus title, in addition to the titles in the title list illustrated in FIG. 27. Title #3 provides a game to be executed in sync with playback of the main feature movie. When Title #3 is selected, an application for main feature playback is activated to start main feature playback. In response to an event such as a request for fast-forward playback or skip playback made at a push of a key on the remote controller, the application for main feature playback issues necessary instructions to the media playback module, so that operations of the playback device is controlled accordingly.

Figure 42:
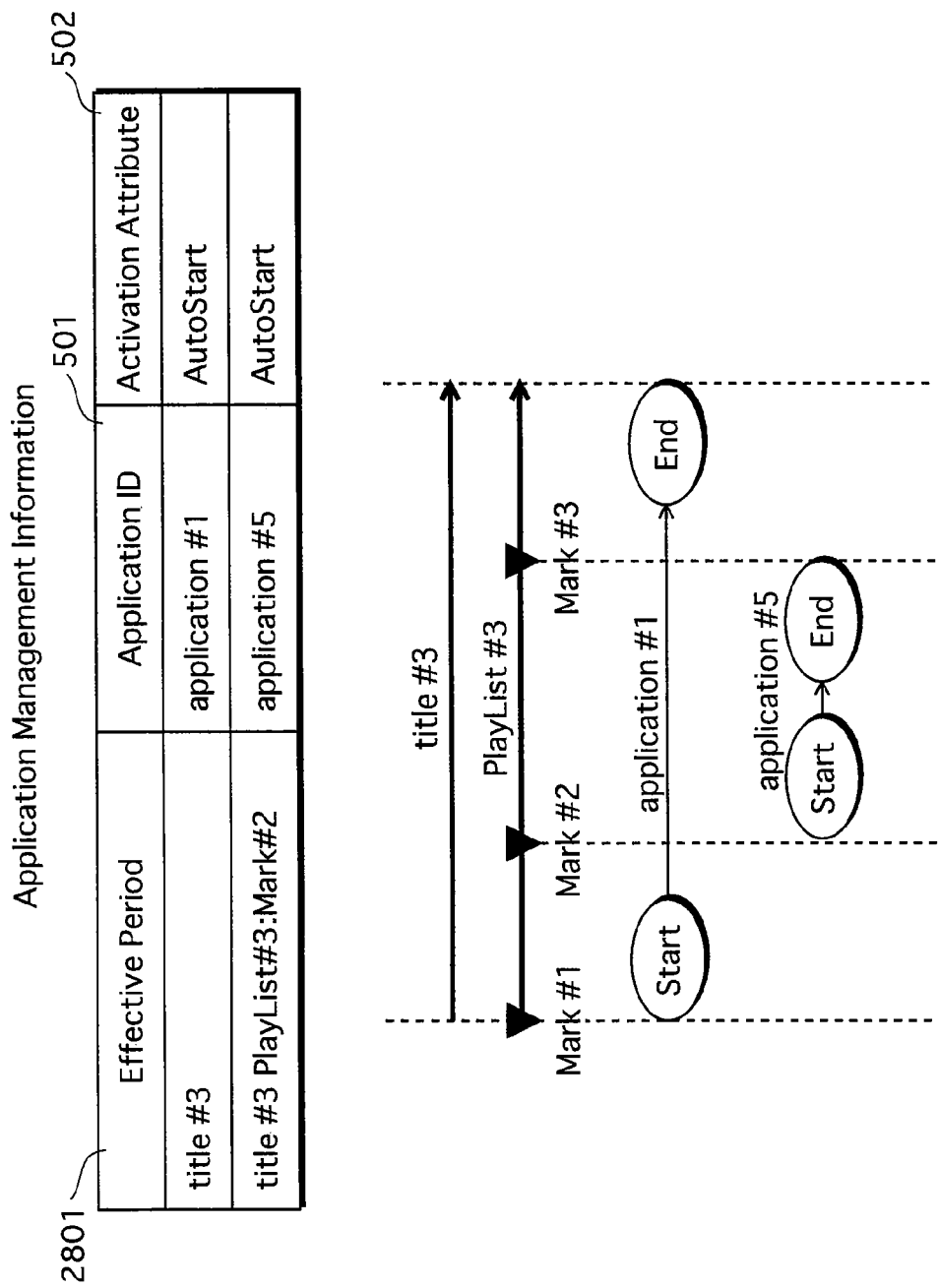
FIG. 42 illustrates applications executed in accordance with a title transition.

FIG. 42 illustrates an example of application management information which allows an application to be automatically activated when the current playback point reaches a PlayList mark during playback of the bonus title illustrated in FIG. 41. The figure also illustrates processes performed to that effect. Application #5 has the "AutoStart" attribute and its effective period is Mark#2. Thus, when the playback point reaches Mark#2, Application #5 is automatically activated.

As described above, according to the second embodiment, execution of a Java application is so controlled that the Java application is not activated or terminated during trickplay of video data. When trickplay ends, the Java application is activated or terminated according to the application management information. That is to say, the second embodiment avoids uselessly activating an application during a certain type of trickplay if the application cannot be synchronized with video data playback during the type of trickplay.

Yet, by setting the in-trickplay end flag to "Yes", the application is allowed to be terminated upon a scenario transition even during trickplay.

Further, by setting the in-trickplay activation flag to "Yes", the application is allowed to be activated upon a scenario transition even during trickplay.

Further, by setting the fast playback flag to "Yes", the application is allowed to be activated and terminated upon a scenario transition even during fast-speed playback.

Further, the application may be allowed to be activated and terminated upon a scenario transition even during trickplay, provided that the playback rate falls within the range of specified trickplay rate.

Note that trickplay may be chapter search or time search.

In addition, the second embodiment may be so modified that application management information collectively defines, for all the applications registered in the application management information, execution control of the applications during trickplay, rather than defining different execution control for each application. Alternatively, the setting may be made on the playback device so as to collectively define execution control of all the applications during trickplay.

Third Embodiment

A third embodiment of the present invention is based on the second embodiment and additionally implements delayed activation and termination of an application in response to a user operation relating to trickplay. To this end, the state of each application is stored in response to a scenario transition during trickplay, and the application is activated or terminated in accordance with the state of the application at the time when trickplay ends.

Figure 43:
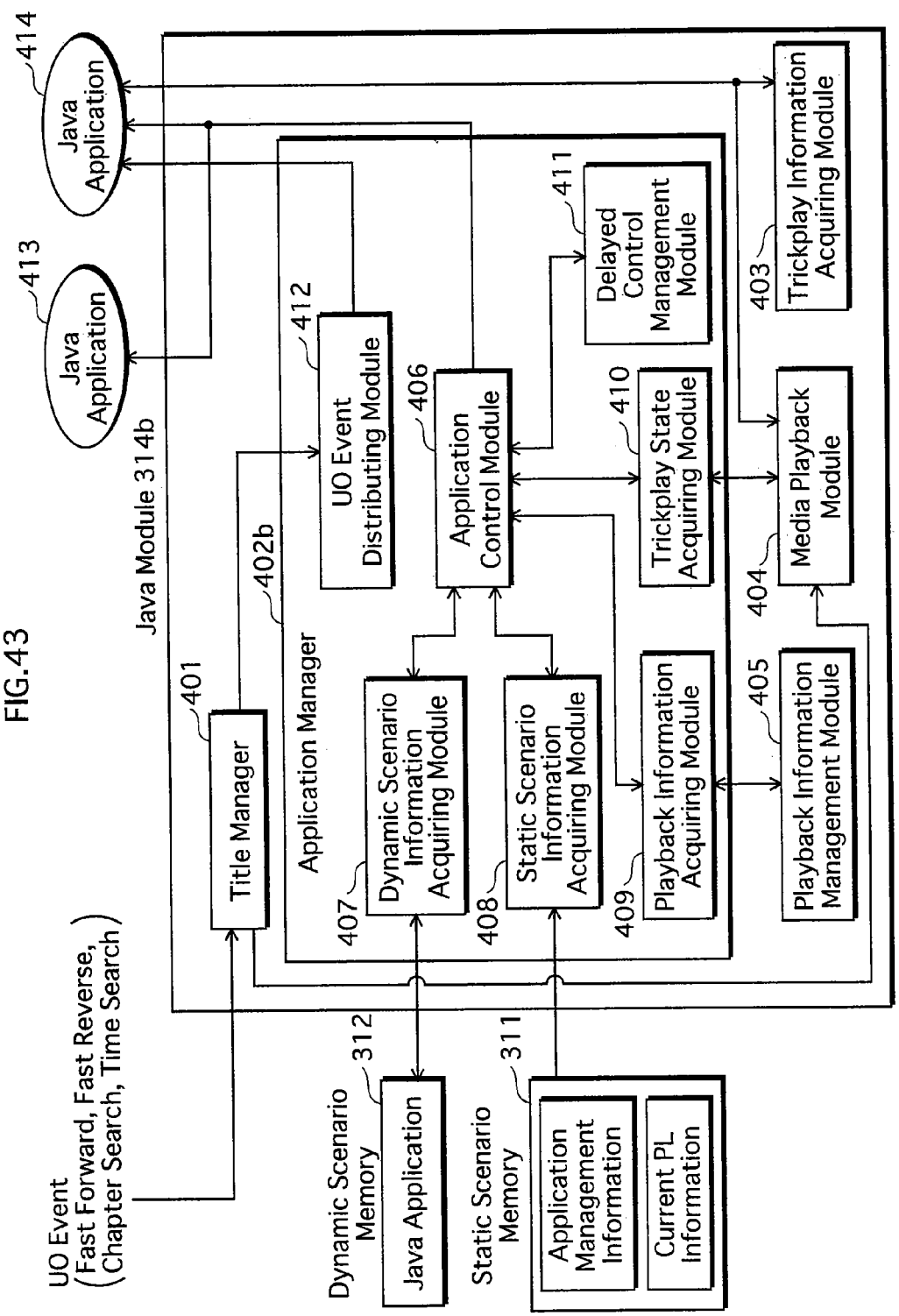
FIG. 43 is a block diagram of a structure of a playback device according to a third embodiment of the present invention, related to processes performed in response to a user operations of requesting trickplay.

FIG. 43 is a block diagram illustrating the detailed structure of a Java module 314b and an application manager 402b according to the third embodiment. As illustrated in the figure, a delayed control management module 411 is additionally provided to the structure illustrated in FIG. 26. The structure illustrated in FIG. 43 relates to process of execution control of an application in accordance with trickplay, such as fast forward playback, fast reverse playback, chapter search, and time search.

When the Java application 414 executes trickplay, the application control module 406 controls behavior of the Java applications 413 and 414 acquired from the dynamic scenario acquiring module 407. The control is executed based on the application management information acquired from the static scenario acquiring module 408, the trickplay state (trickplay start, trickplay execution, and trickplay end) acquired from the trickplay state acquiring module 410, the playback information acquired from the playback information acquiring module 409, the application state acquired from the delayed control management module 411, and time information.

Next, FIG. 44 illustrates an example of the application activation state management information stored in the delayed control management module 411 according to the third embodiment. An application activation state 601a indicates either of "AutoStart", "Destroy", and "Present".

The "AutoStart" indicates that the corresponding application is to be automatically activated after trickplay ends.

The "Destroy" indicates that the corresponding application is to be automatically terminated after trickplay ends.

The "Present" indicates that the corresponding application is neither automatically activated nor terminated. The application having the "Present" attribute is activated by another application or in response to an event such as a user operation.

Figure 45:
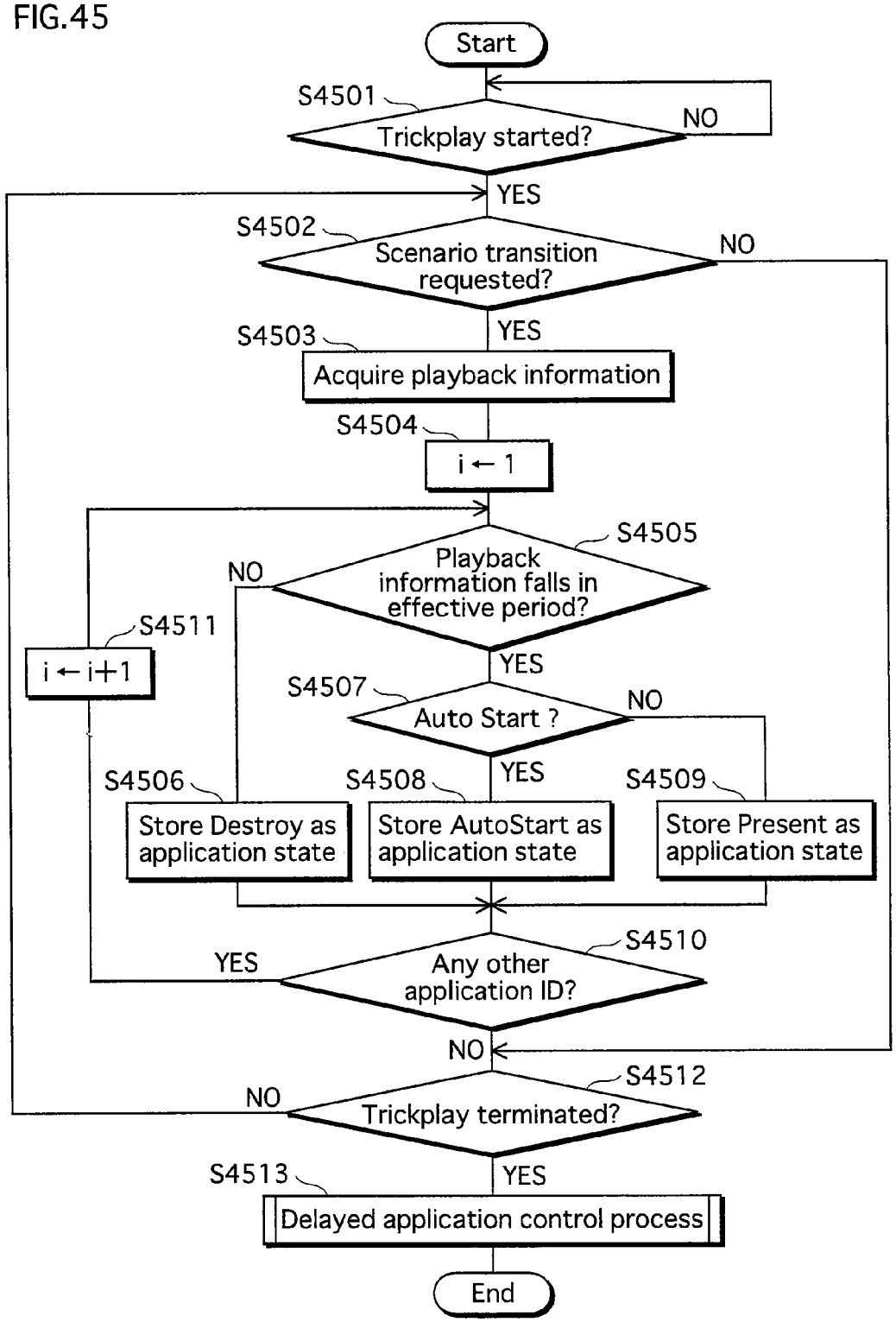
FIG. 45 is a flowchart of processing steps performed according to the third embodiment for execution control of applications during trickplay.

FIG. 45 illustrates an exemplary flowchart of processing steps performed by the application control module 406. According to the third embodiment, the application control module 406 includes a mechanism for judging whether to delay activation or termination of the application in accordance with the application management information, when a trickplay start event is received from the trickplay state acquiring module 410. In the flowchart, the letter "i" represents a variable specifying one of application IDs indicated in the application management information. First of all, the application control module 406 monitors whether the trickplay state acquiring module 410 receives a trickplay start event (Step S4501). Upon receipt of a trickplay start event, trickplay starts. It is then judged whether the trickplay state acquiring module 410 receives a scenario transition event during trickplay (Step S4502). Upon receipt of a scenario transition event, the application control module 406 acquires current playback information from the playback information acquiring module 409 (Step S4503). More specifically, the current playback information acquired herein includes the title number SPRM(4), chapter number SPRM(5), PlayList ID SPRM(6), and PlayItem ID SPRM(7). Then, the variable "i" is initialized (Step S4504). Next, it is judged whether the playback information falls within the effective period (Step S4505). The judgment is made with reference to the current playback information (title number SPRM(4), chapter number SPRM(5), PlayList ID SPRM(6), and PlayItem ID SPRM(7)) and the effective period indicated in the application management information. If the playback information does not fall within the effective period, the application activation state "Destroy" is stored into the delayed control management module 411 (Step S4506). If the playback information falls within the effective period, it is then judged whether the activation attribute indicated in the application management information is "AutoStart" (Step S4507). If the activation attribute is "AutoStart", the application activation state "AutoStart" is stored into the delayed control management module 411 (Step S4508). On the other hand, if the activation attribute is not "AutoStart", the application activation state "Present" is stored into the delayed control management module 411 (Step S2709). After the above processing steps, it is judged whether the application management information indicates any other application ID (Step S4510). If any other application ID is indicated, the variable "i" is incremented by one (Step S4511) and Step S4505 is performed next. If no other application ID is indicated or if it is judged in Step S4502 that no scenario transition event is received, it is judged whether the trickplay state acquiring module 410 receives a trickplay end event (Step S4512). If a trickplay end event is received, a delayed application control process is performed (Step S4513). If a trickplay end event is not received, Step S4502 is performed.

Figure 46:
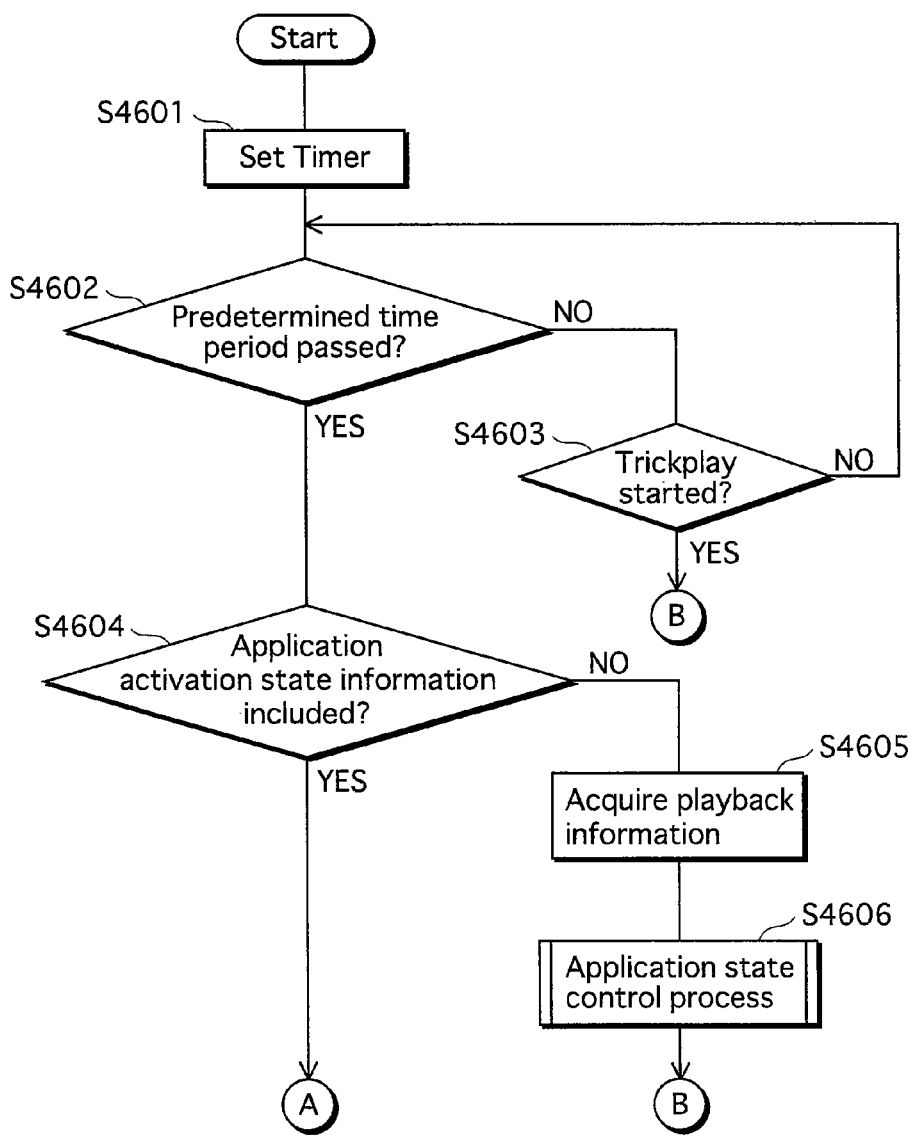
FIG. 46 is a flowchart of an application delayed control process illustrated in FIG. 45.
Figure 47:
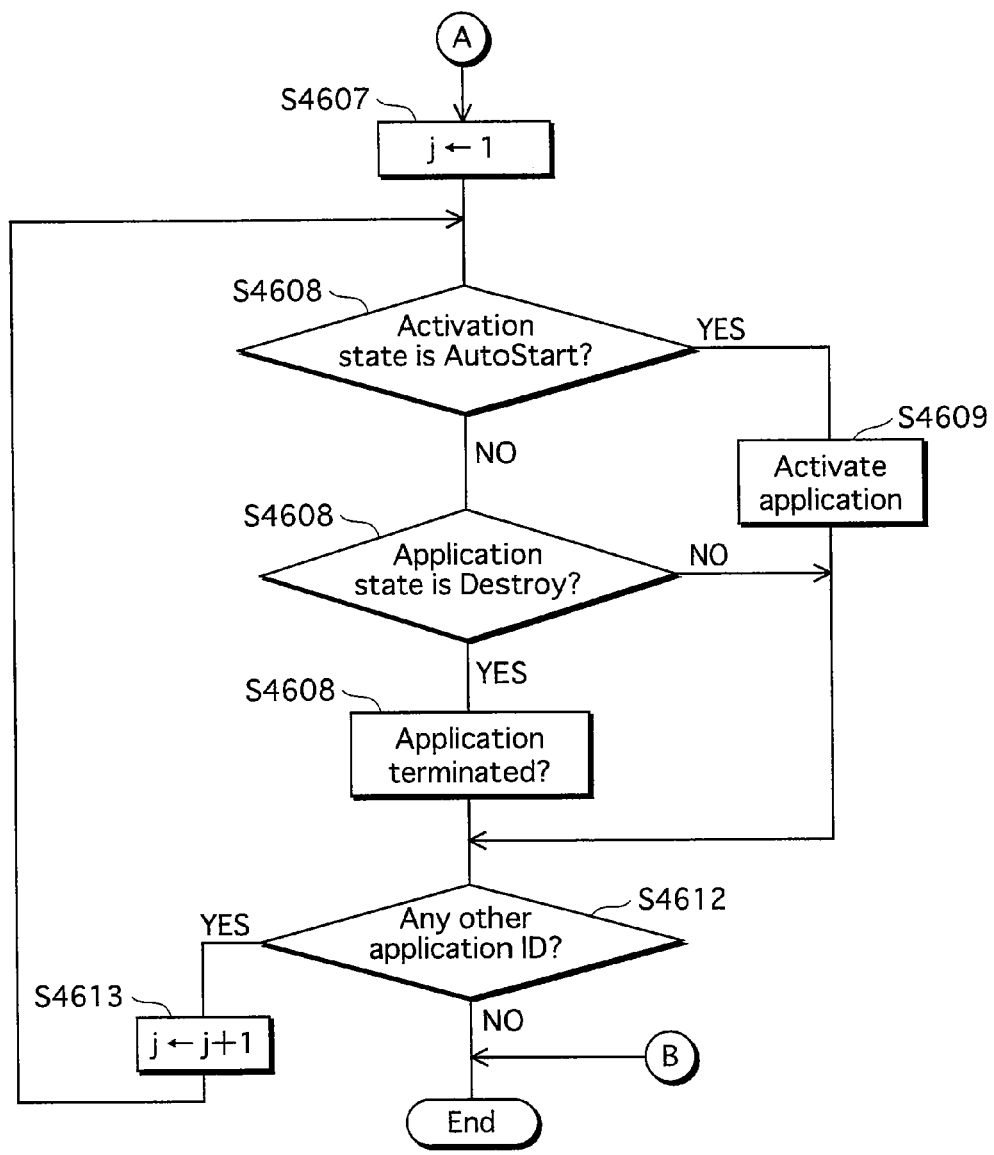
FIG. 47 is the flowchart of an application delayed control process illustrated in FIG. 45.

Next, FIGS. 46 and 47 illustrate an exemplary flowchart of the delayed application control process illustrated in FIG. 45. The letter "j" represents a variable specifying one of application IDs indicated in the application activation state management information. First of all, the timer is set (Step S4601) to judge whether the predetermined time period has passed (Step S4602). If the predetermined time period has not passed yet, it is judged whether the trickplay information acquiring module receives a trickplay start event (Step S4603). Upon receipt of a trickplay start event, the process is terminated. If a trickplay start event is not received, Step S4602 is performed. If the predetermined time period has passed, it is judged whether the delayed control management module 411 includes application activation state management information (Step S4604). If application activation state management information is not included, the application control module 406 acquires current playback information from the playback information acquiring module 409 (Step S4605). More specifically, the current playback information acquired herein includes the title number SPRM(4), chapter number SPRM(5), PlayList ID SPRM(6), and PlayItem ID SPRM(7) to perform the application state control process (Step S4606). If application activation state management information is included, the variable "j" is initialized (Step S4607). It is then judged whether the application activation state is "AutoStart" (Step S4608). If the application activation state is "AutoStart", the application is activated (Step S4609). If the application activation state is not "AutoStart", it is judged whether the application activation state is "Destroy" (Step S4610). If the application activation state is "Destroy", the application is terminated (Step S2911). After the above processing steps, it is judged whether the application activation state management information indicates any other application ID (Step S4612). If any other application ID is indicated, the variable "j" is incremented by one (Step S4613) and Step S4608 is performed next. If no other application ID is indicated, the process is terminated.

As described above, according to the third embodiment, a Java application is activated or terminated a predetermined time period after trickplay ends. In order to allow such a delayed activation or termination, the activation attribute of the Java application is stored in advance. Thus, the time required for activating or terminating the Java application is shorter, as compared with the case where a Java application is activated or terminated by reading the application management information after trickplay ends.

Supplemental Notes

Up to this point, the playback device according to the present invention has been described by way of the above embodiments. It should be naturally appreciated, however, that the present invention is not limited to those specific embodiments.

Although the above embodiments are described taking the BD-ROM as example, HD-DVD or other optical discs may be employed.

Although the above embodiments relate to a playback device, the present invention may be practiced as a method including the processing steps shown in any of the above flowcharts. Further, the present invention may be practiced as a program including program code for causing a computer to execute the processing steps shown in any of the above flowcharts. Still further, the present invention may be practiced as an integrated circuit such as an LSI circuit that implements the functions of the playback device. A system LSI may be referred to as IC, LSI, super LSI, or ultra LSI, depending on the packaging density.

In addition, an integrated circuit may be fabricated not only by way of LSI. For example, it is applicable to use an FPGA (Field Programmable Gate Array) post-manufacturing programming of an LSI circuit. It is also applicable to use a reconfigurable processor that allows reconfiguration of connection between circuit cells within an LSI circuit and their settings. When any new circuit integration technology becomes available or derived as the semiconductor technology advances, such new technology may be employed to integrate the functional blocks of the present invention. One possible candidate of such new technology may be achieved by adapting biotechnology.

INDUSTRIAL APPLICABILITY

The playback device embodying the present invention can be manufactured continuously and repeatedly on a commercial basis. The playback device is industrially usable especially in the movie industry related to movie contents production and the commercial device industry.

The invention claimed is:

1. A playback device comprising:
 a timer;
 a detector that detects a user input,
 a measurer that causes the timer to start measuring a time period based on the user input detected;
 a resetter that resets the timer when the detector further detects a user input before the time period measured by the timer reaches a predetermined time period and causes the timer to restart measuring a time period based on the user input further detected;
 a class loader that acquires an application management table from a memory when the time period measured by the timer reaches the predetermined time period and activates an application shown in the acquired application management table, the application management table to be acquired being associated with the user input that caused the measurement resulting in the measured time period reaching the predetermined time period; and
 an application manager that terminates, when the application shown in the acquired application management table is activated, any currently executed application that is not shown in the acquired application management table,
 wherein the received user input is an input of selecting a title associated with the application management table showing the application to be activated.

2. The playback device according to claim 1, further comprising:
 a judger that judges whether or not the time period measured by the timer has reached the predetermined time period,
 wherein when the judger judges that the time period measured by the timer has reached the predetermined time period, the activator receives the user input that caused the measurement resulting in the measured time period reaching the predetermined time period.

3. The playback device according to claim 1, further comprising:
 an acquirer that acquires an activation attribute of the application associated with the selected title,
 wherein the activator activates the application associated with the selected title on condition that the acquired activation attribute shows that the application is to be activated.

4. The playback device according to claim 1, further comprising:
 a distributor that distributes each user input detected by the detector to the measurer.

5. A playback method comprising:
 detecting a user input;
 causing a timer to start measuring a time period based on the user input detected,
 resetting the timer when a user input is further detected before the time period measured by the timer reaches a predetermined time period and causing the timer to restart measuring a time period based on the user input further detected; and
 acquiring an application management table from a memory when the time period measured by the timer reaches the predetermined time period and activating an application shown in the acquired application management table, the application management table to be acquired being associated with the user input that caused the measurement resulting in the measured time period reaching the predetermined time period; and terminating, when the application shown in the acquired application management table is activated, any currently executed application that is not shown in the acquired application management table, wherein the received user input is an input of selecting a title associated with the application management table showing the application to be activated.

* * * * *